A. A. ADAMS AND F. A. EMERY.
WEIGHING MACHINE.
APPLICATION FILED JAN. 31, 1910.

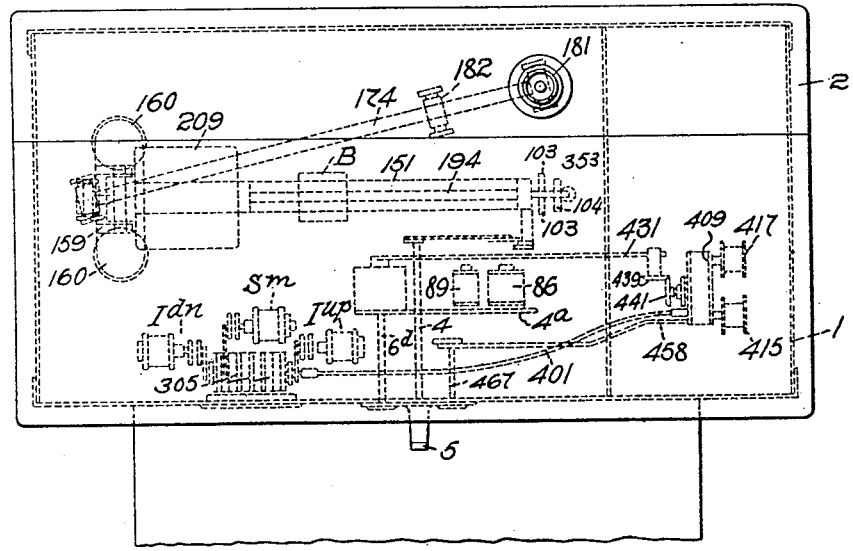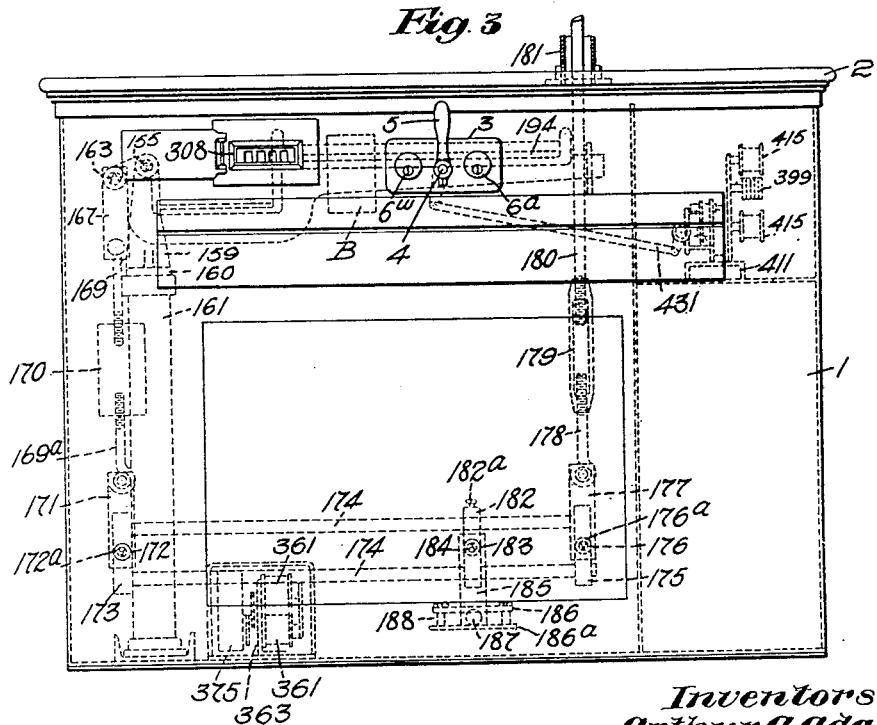

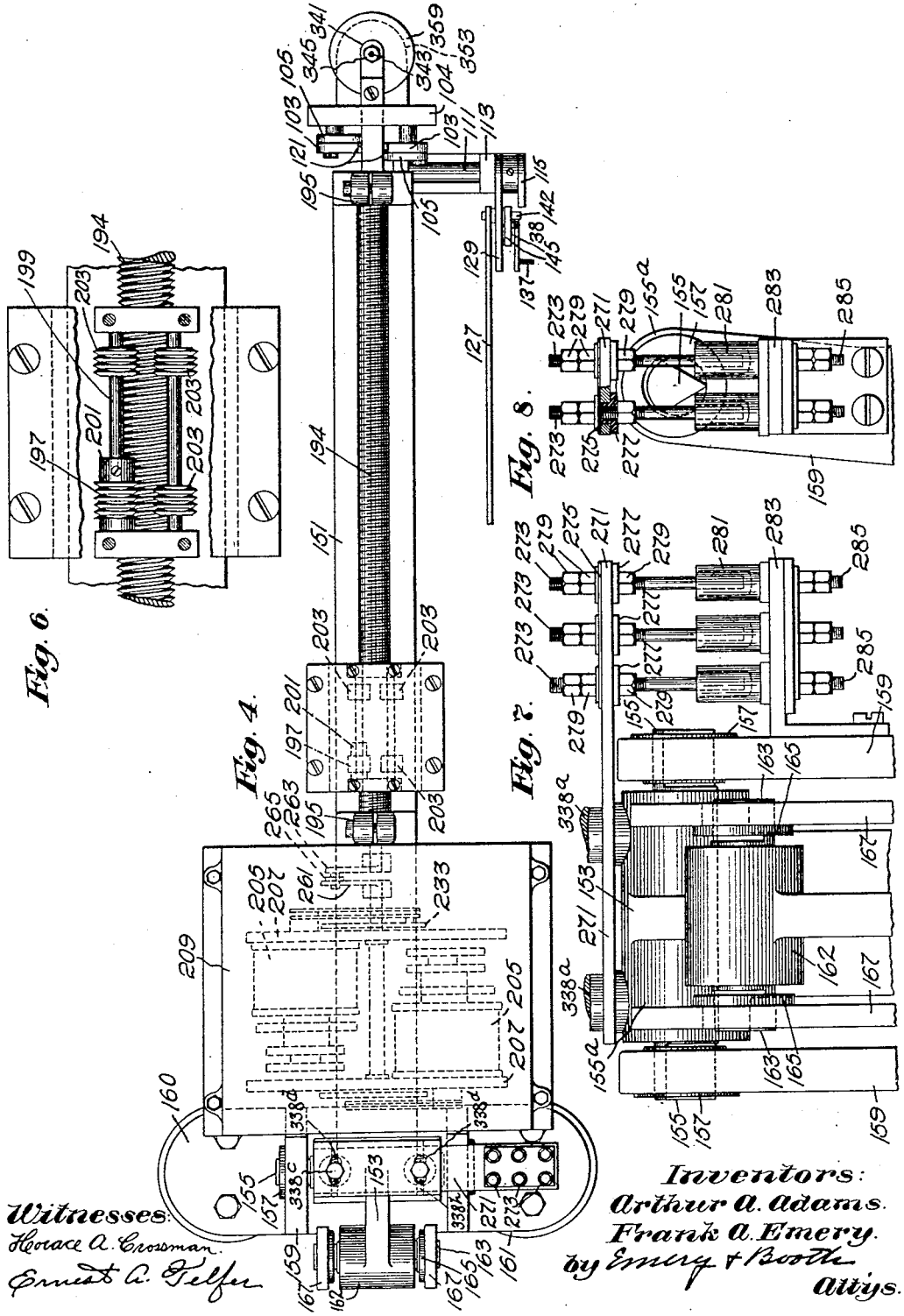

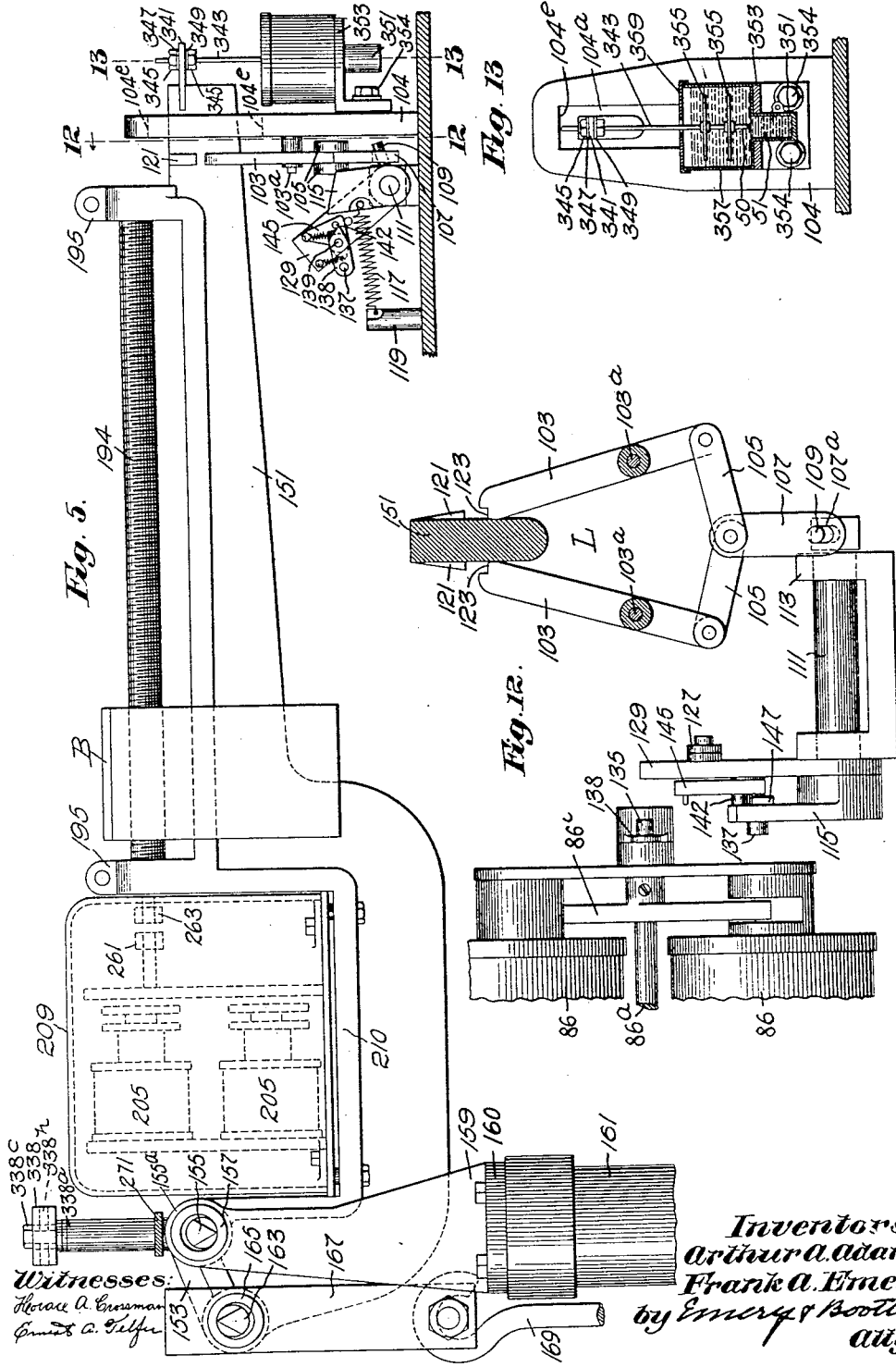
A. A. ADAMS AND F. A. EMERY.
WEIGHING MACHINE.
APPLICATION FILED JAN. 31, 1910.
1,385,739.
Patented July 26, 1921.
14 SHEETS—SHEET 4.

1,385,739.

Patented July 26, 1921.
14 SHEETS—SHEET 5.

Witnesses:
Ernest A. Felt
Horace A. Crossman

Inventors:
Arthur A. Adams.
Frank A. Emery.
by Emery & Booth
attys.

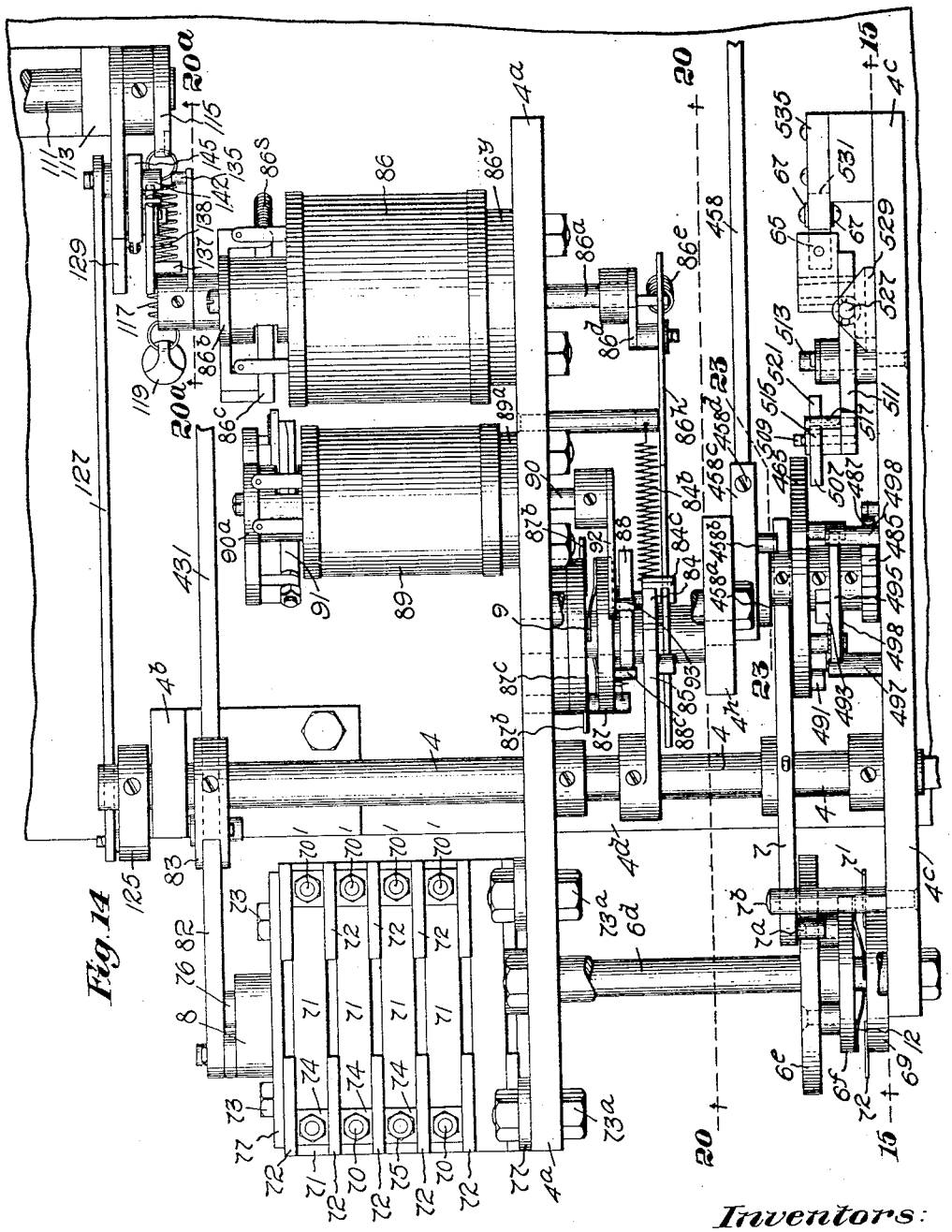

BEST AVAILABLE COPY
A. A. ADAMS AND F. A. EMERY.
WEIGHING MACHINE.
APPLICATION FILED JAN. 31, 1910.
1,385,739.
Patented July 26, 1921.
14 SHEETS—SHEET 7.
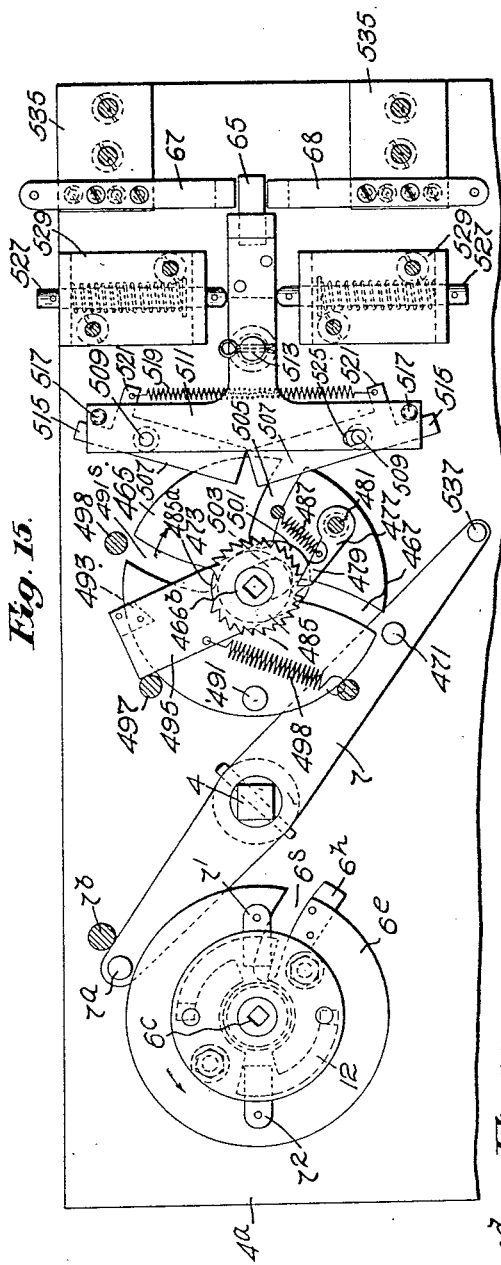
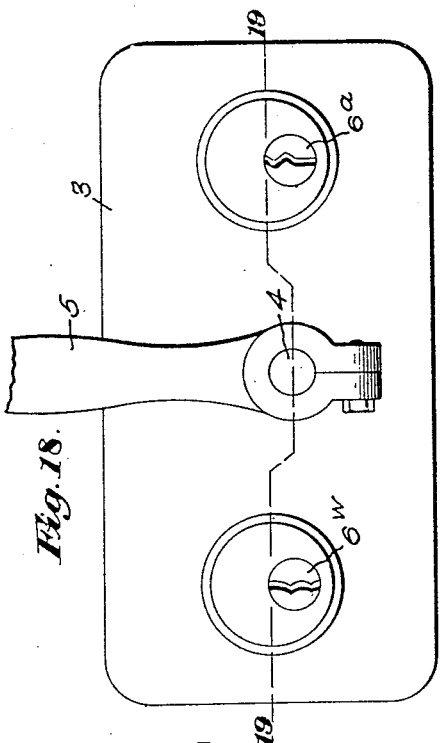
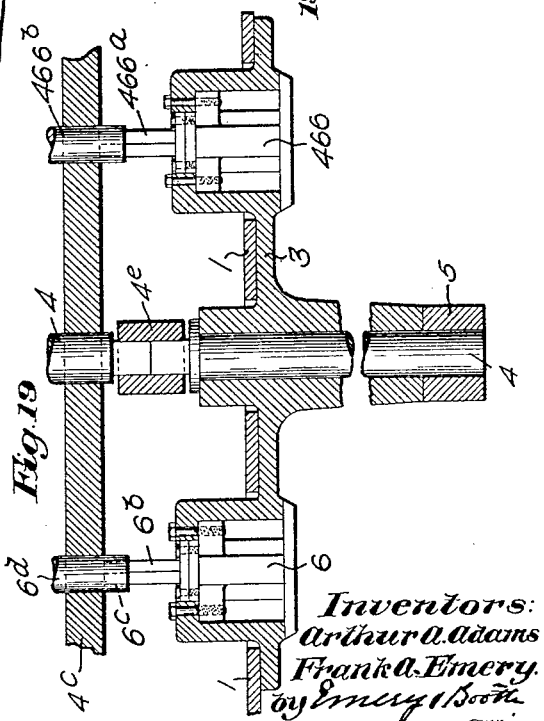
Witnesses:
Inventors:
Arthur A. Adams
Frank A. Emery
by Emery Booth
Attys.

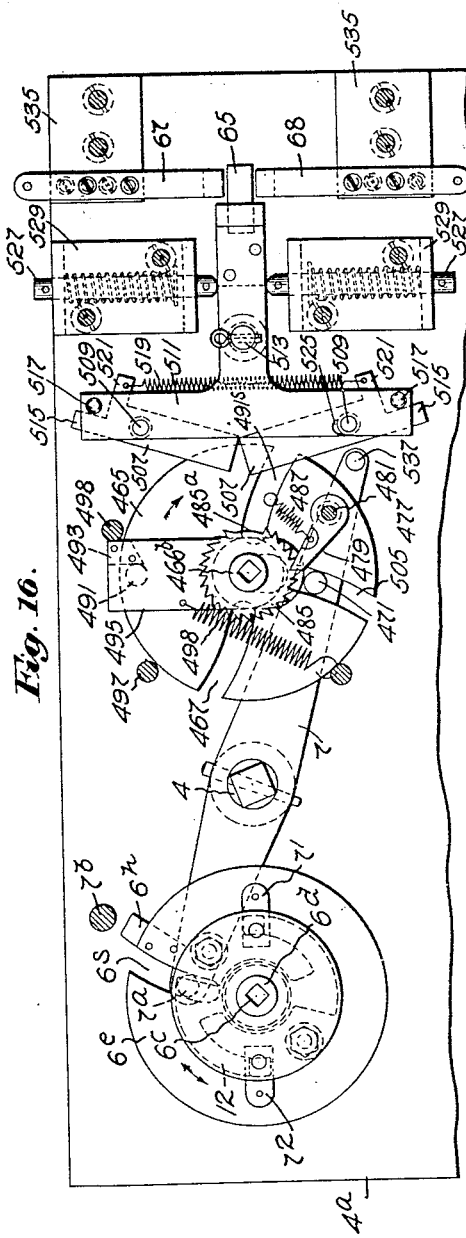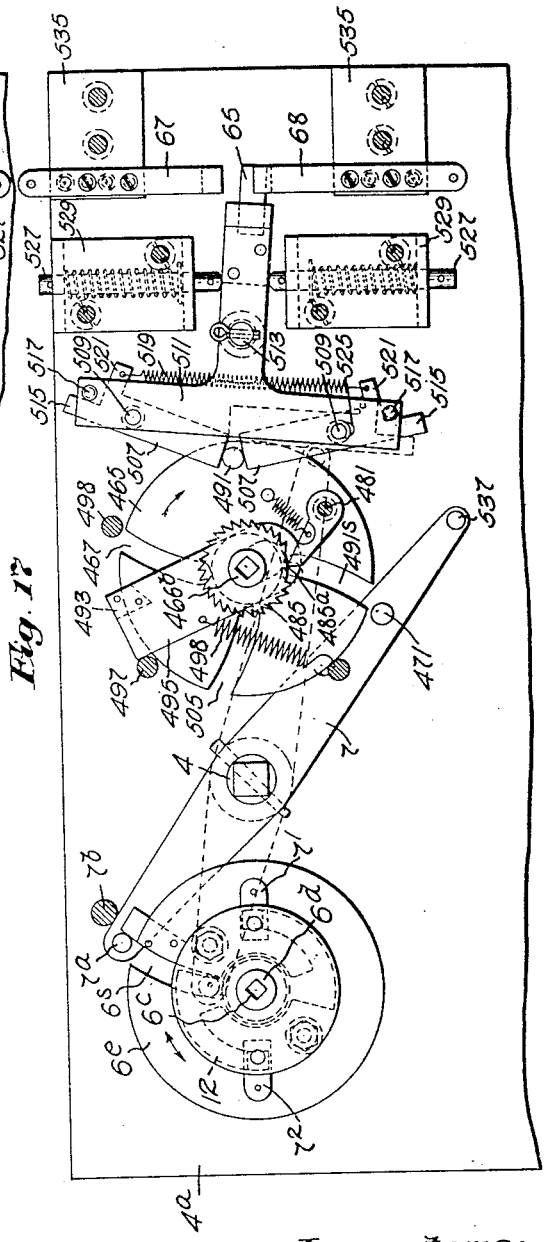

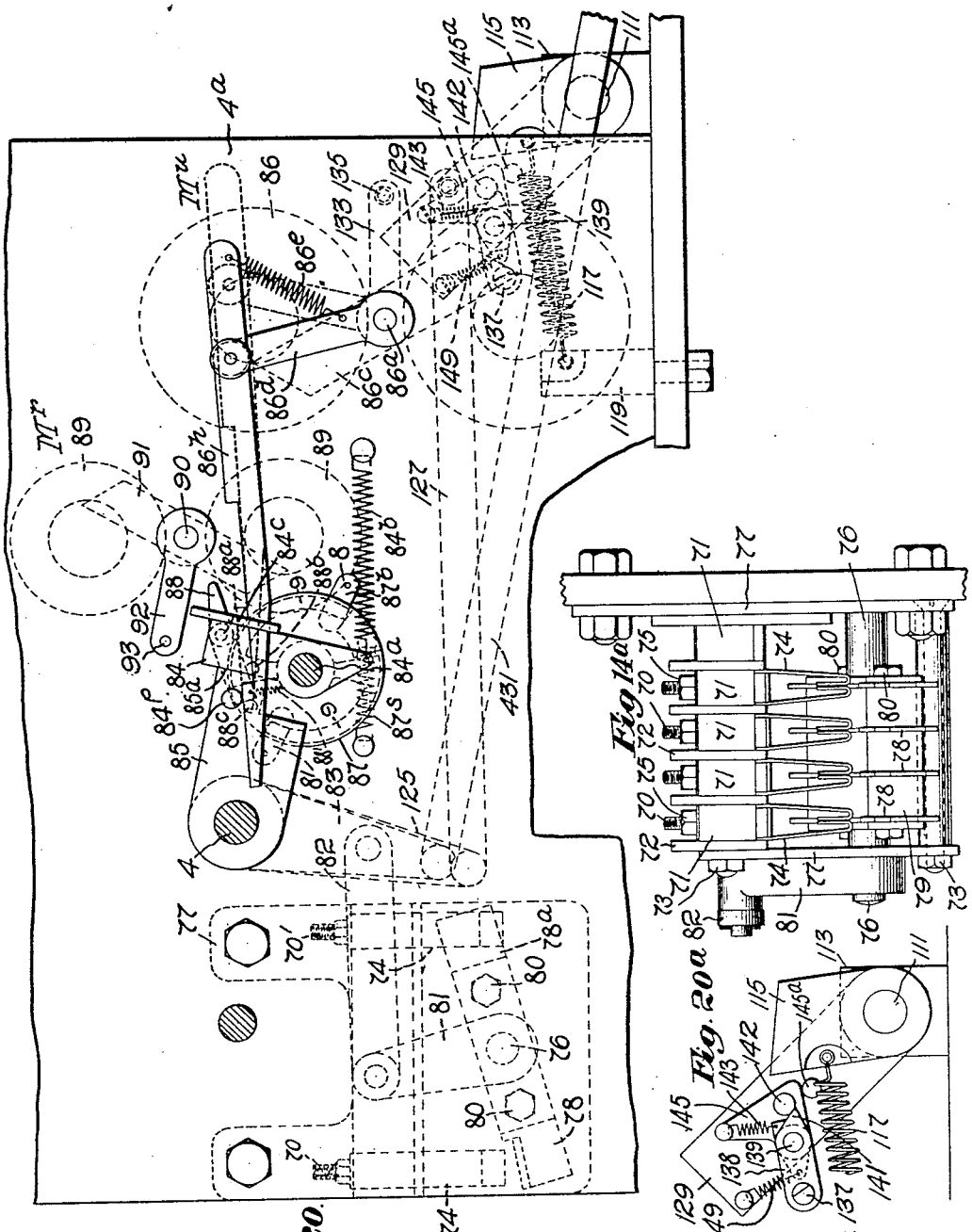

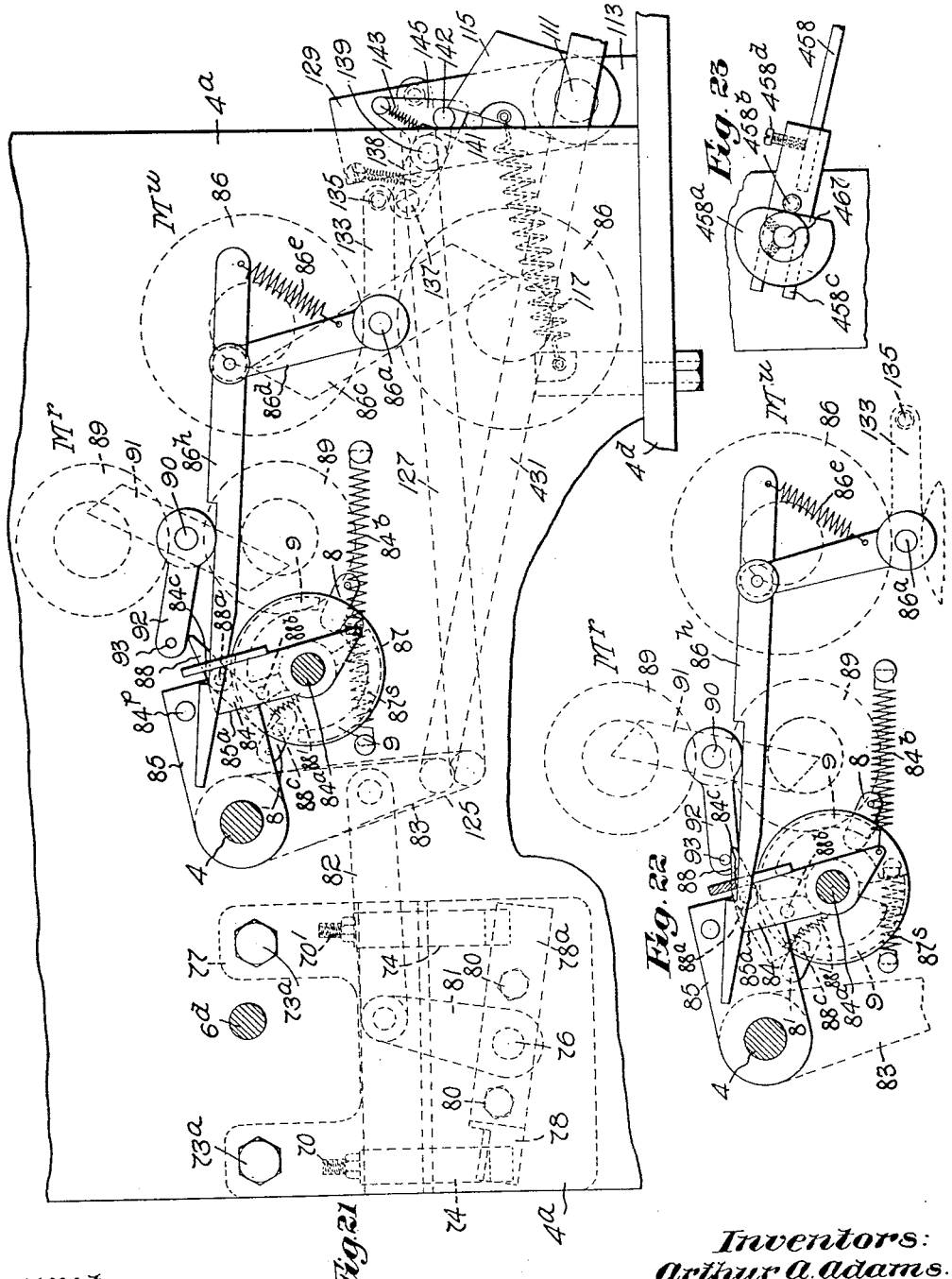

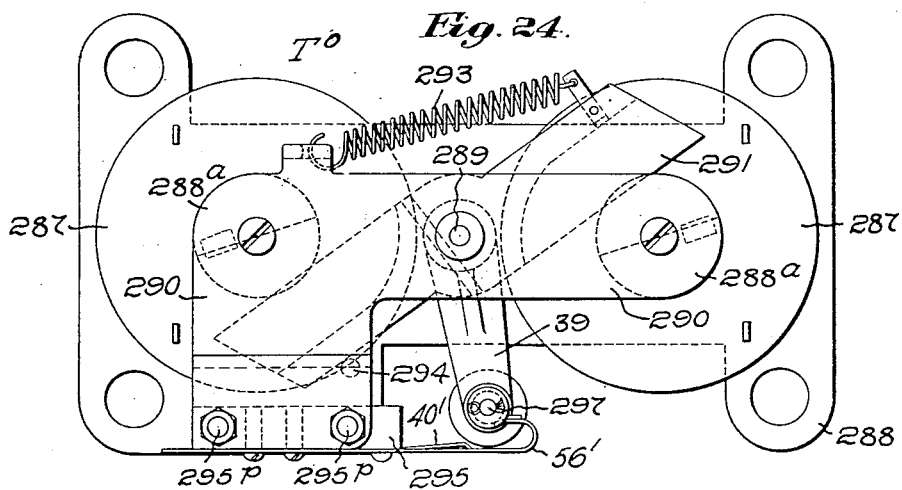
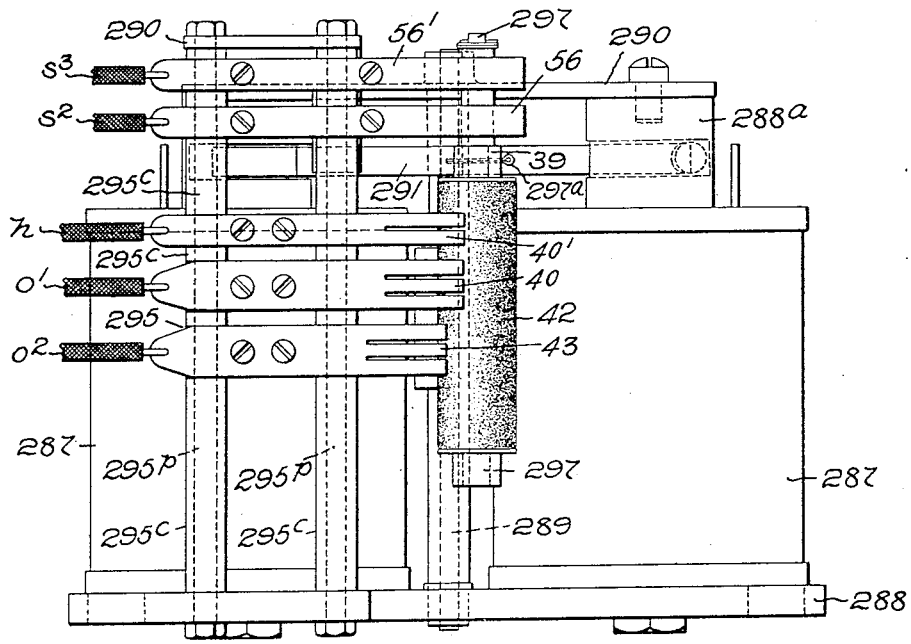

A. A. ADAMS AND F. A. EMERY.
WEIGHING MACHINE.
APPLICATION FILED JAN. 31, 1910.
1,385,739.
Patented July 26, 1921.
14 SHEETS—SHEET 12.
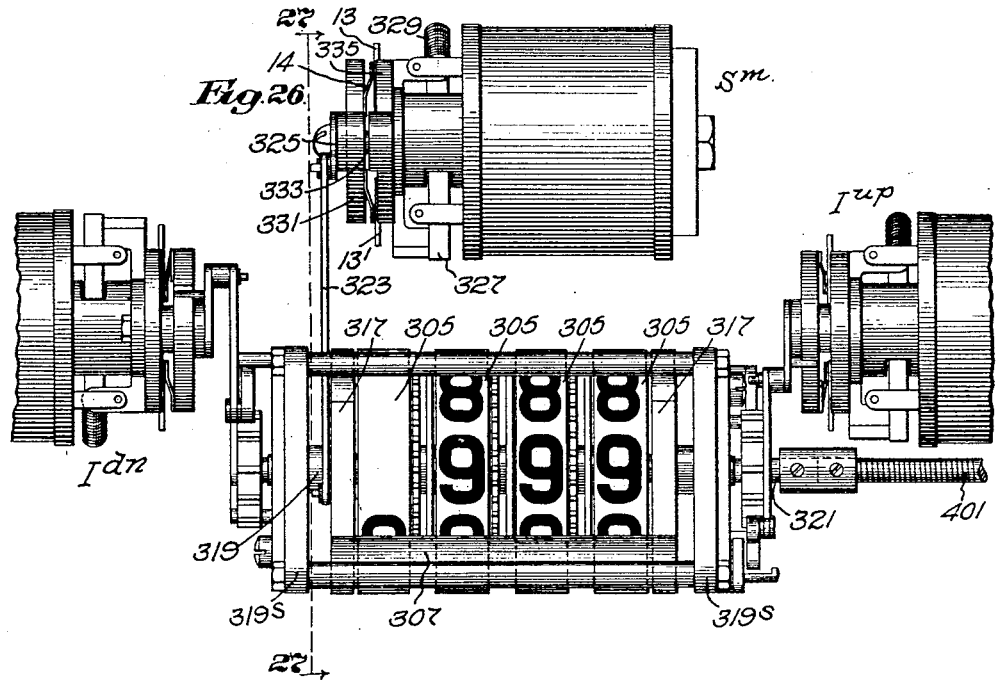
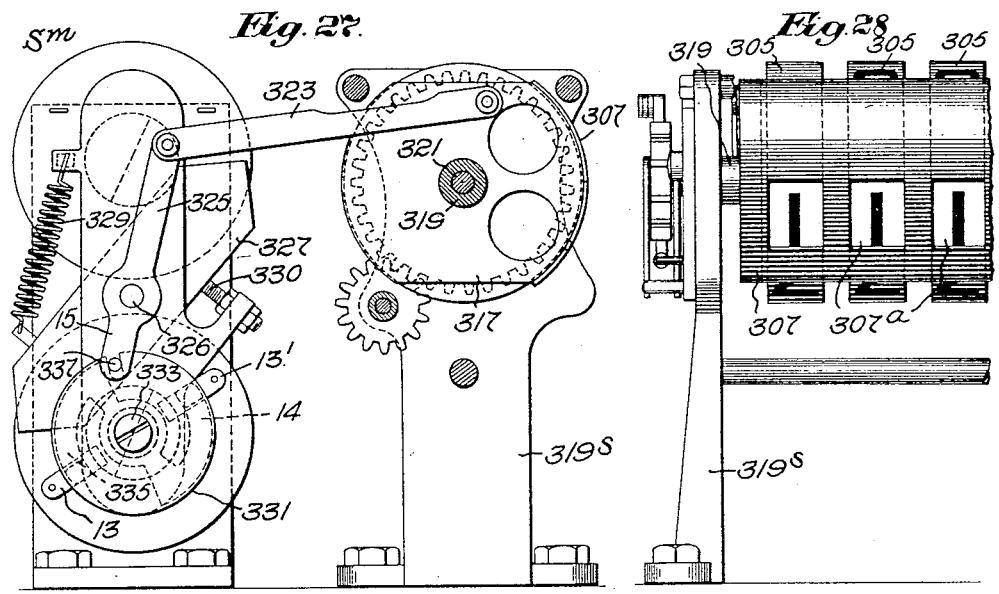
Witnesses:
Horace A. Crossman
Ernest A. Telfer
Inventors:
Arthur A. Adams.
Frank A. Emery.
by Emery & Booth
attys.

A. A. ADAMS AND F. A. EMERY.
WEIGHING MACHINE.
APPLICATION FILED JAN. 31, 1910.
1,385,739.
Patented July 26, 1921.
14 SHEETS—SHEET 13.
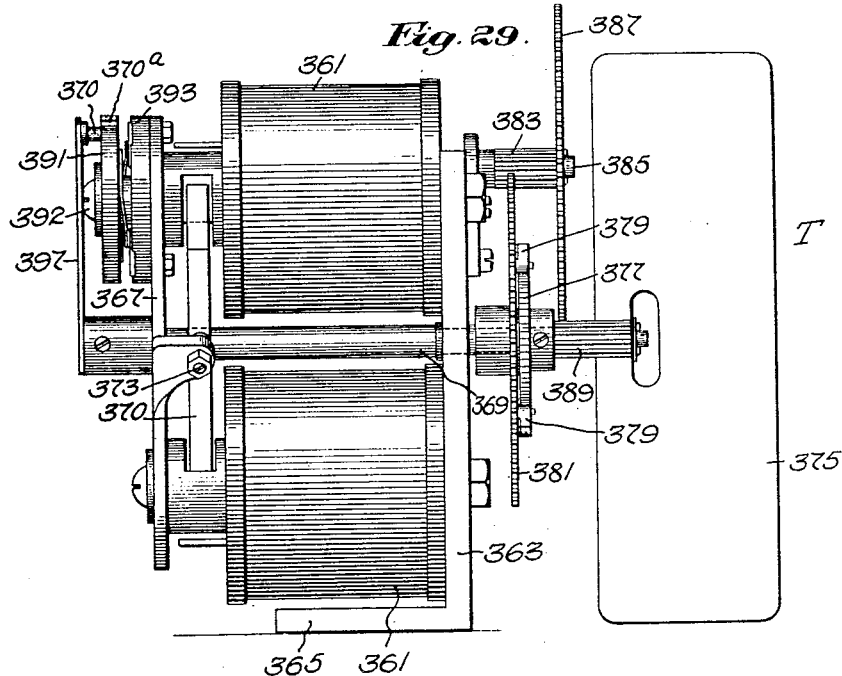
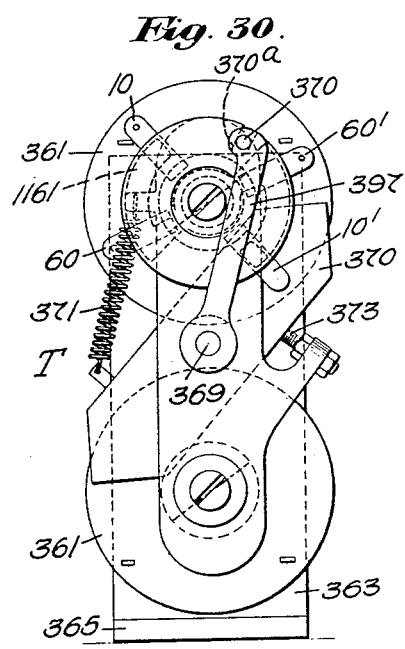
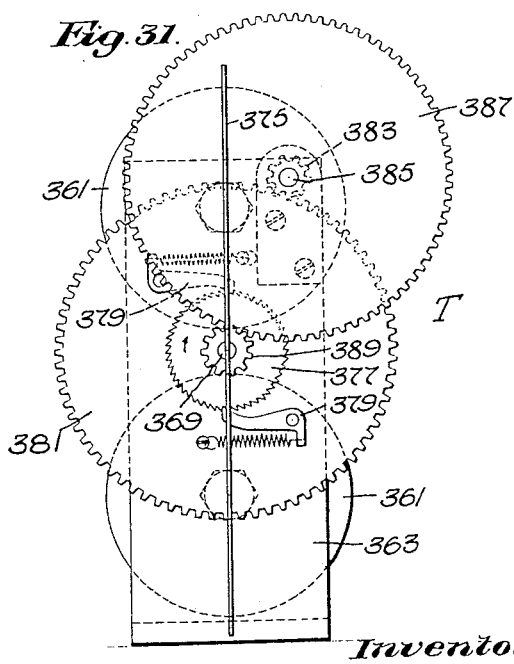
Witnesses:
Horace A. Crossman
Ernest A. Telfer
Inventors:
Arthur A. Adams
Frank A. Emery
by Emery & Booth
Attys.

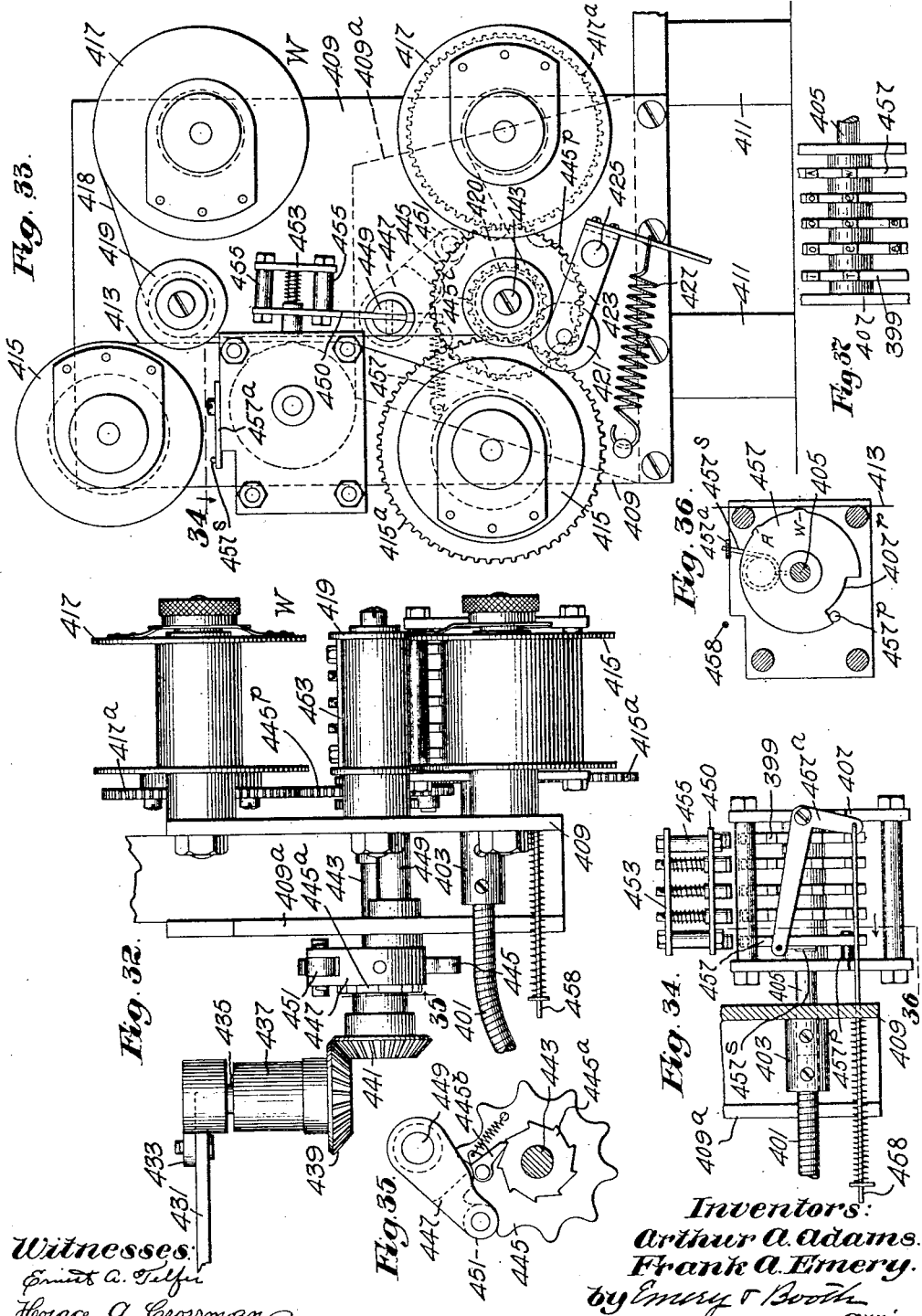

UNITED STATES PATENT OFFICE.

ARTHUR A. ADAMS, OF BROOKLINE, AND FRANK A. EMERY, OF ASHMONT, MASSACHUSETTS, ASSIGNORS, BY MESNE ASSIGNMENTS, TO BOSTON SCALE AND MACHINE CO., OF BOSTON, MASSACHUSETTS, A CORPORATION OF MASSACHUSETTS.

WEIGHING-MACHINE.

1,385,739.   Specification of Letters Patent.   Patented July 26, 1921.

Application filed January 31, 1910. Serial No. 540,937.

*To all whom it may concern:*

Be it known that we, ARTHUR A. ADAMS and FRANK A. EMERY, citizens of the United States, residing at Brookline and Ashmont, respectively, in the counties of Norfolk and Suffolk, respectively, and all in the State of Massachusetts, have invented an Improvement in Weighing-Machines, of which the following description, in connection with the accompanying drawings, is a specification, like letters on the drawings representing like parts.

This invention relates to weighing machines or scales and more particularly, although not exclusively, to scales of the platform type and, among other objects, aims to provide means whereby a weighing operation, once initiated, will be automatically completed, and the weight indicated and recorded before another weighing operation can take place, the machine being constructed to prevent any fraudulent or other tampering therewith.

The character of the invention may be best understood by reference to the following description of an illustrative embodiment thereof shown in the accompanying drawings, wherein:

Fig. 2 is a plan view of a casing showing in dotted lines parts of the weighing machine;

Fig. 3 is an elevation of Fig. 2;

Fig. 4 is a plan of the weighing beam;

Fig. 5 is a side elevation of Fig. 4;

Figure 9:
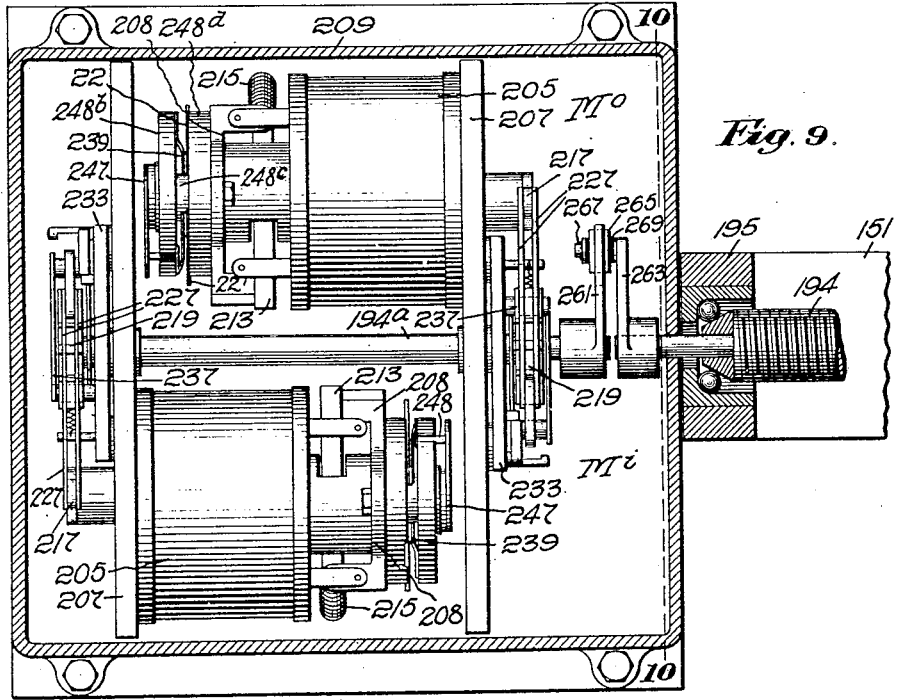
Figure 10:
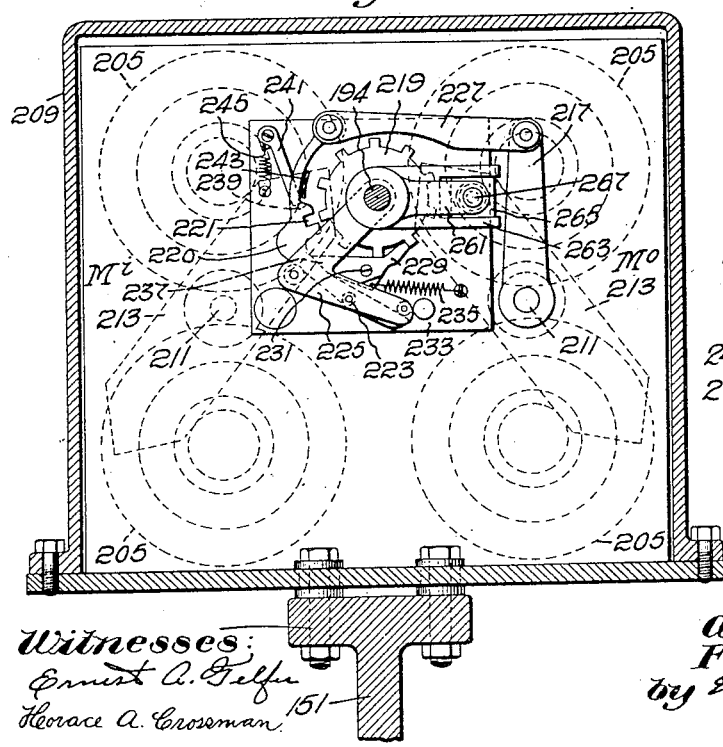
Figure 11:
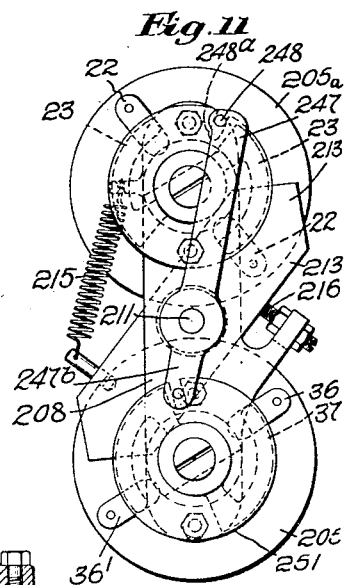

Fig. 6 on an enlarged scale shows the mounting of the poise on the beam shown in Fig. 4;

Fig. 7 on an enlarged scale shows a portion of the weighing beam and electrical connections therefor;

Fig. 8 is a side elevation of Fig. 7;

Fig. 9 is a horizontal section through a casing showing motors for causing the counterpoise to travel along the beam;

Fig. 10 is a section taken on line 10—10 of Fig. 9;

Fig. 11 is an end elevation of one of the motors shown in Fig. 9;

Fig. 12 is a vertical section taken on the line 12—12 of Fig. 5;

Fig. 13 is a vertical section taken on line 13—13 of Fig. 5;

Fig. 14 is a plan view of operating mechanism for the machine;

Fig. 14$^a$ is an end elevation of a switch shown in Fig. 14;

Fig. 15 is a vertical section taken on line 15—15 of Fig. 14;

Fig. 16 is a view similar to that shown in Fig. 15 with the parts differently positioned;

Fig. 17 is a view similar to Fig. 16 showing the parts in still another position;

Fig. 18 on an enlarged scale shows a controlling handle and key plate shown in Fig. 3;

Fig. 19 is a section taken on line 19—19 of Fig. 18;

Fig. 20 is a vertical section taken on line 20—20 of Fig. 14;

Fig. 20$^a$ is a sectional detail taken on line 20$^a$—20$^a$ of Fig. 14;

Fig. 21 is a view similar to that shown in Fig. 20, showing the parts in a different position;

Fig. 22 is a partial view of Fig. 21 showing the parts in a still different position;

Fig. 23 is a sectional view taken on line 23—23 of Fig. 14;

Fig. 24 is a plan view of a transmitting unit;

Fig. 25 is an elevation of Fig. 24;

Fig. 26 is a plan of an indicator, its shutter and actuating devices therefor;

Fig. 27 is a vertical section taken on line 27—27 of Fig. 26;

Fig. 28 is a partial front elevation of the indicator shown in Fig. 26;

Fig. 29 is a side elevation of a time unit;

Fig. 30 is an end elevation of Fig. 29 looking toward the right of said figure;

Fig. 31 is an end elevation of Fig. 29 looking toward the left of said figure;

Fig. 32 is a plan view of a printing unit;

Fig. 33 is an elevation of Fig. 32;

Fig. 34 is a section taken on line 34 of Fig. 33;

Fig. 35 is a sectional detail taken on line 35 of Fig. 32; and

Fig. 36 is a sectional detail taken on line 36 of Fig. 34; and

Fig. 37 is a detail view of parts shown in Fig. 34.

Figure 1:
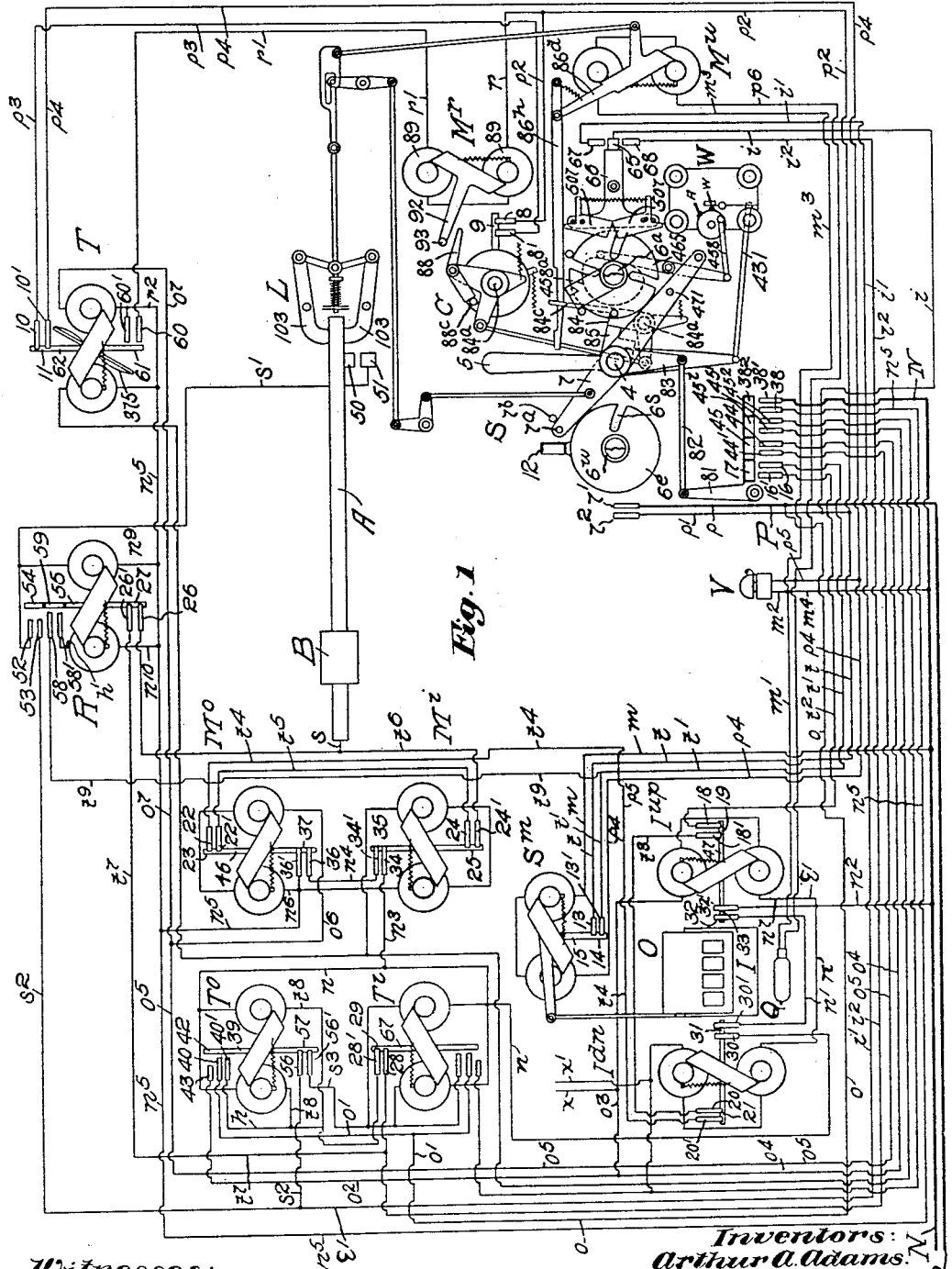
Figure 1 is a diagrammatic view showing the electrical connections between certain elements or members of a weighing machine embodying one form of the invention.

Referring to the drawings and to the embodiment of the invention which is there shown for illustrative purposes, a more ready understanding of the same will be obtained by referring first to the general diagrammatic arrangement illustrated in Fig. 1, wherein there is shown a group of instrumentalities with their electrical and other connections. The machine or apparatus working parts are represented in said figure in conventional form only, being described more fully in detail hereinafter and illustrated more particularly in the remaining figures of the drawings.

In Fig. 1, for purposes of illustration, there is represented diagrammatically a weighing beam A of a weighing machine or scale of any description. On said beam is mounted a poise B which may be advanced out on the beam by an out-beam motor or actuating device $M^o$ and may be advanced inwardly by an in-beam motor or actuating device $M^i$. The actuating devices preferably are constructed to transmit an incremental, or step-by-step feed to said poise. A step-by-step feed is very advantageous for a variety of reasons. Among others, the momentary pause of the poise between the steps insures the arrest of the poise at the proper time without over-travel of the poise such as would be apt to occur if the latter were fed continuously, the inertia of the parts in such case preventing their instantaneous arrest. In scales which are used for weighing heavy loads, it is considered sufficiently accurate for certain purposes, to weigh to the nearest pound or fraction thereof. By the step-by-step feed the increment of travel of the poise may be adjusted to correspond to the desired increment of weight.

An indicator or register I is provided for indicating the weight and may be driven by one or another of two motors or actuating devices $I^{up}$, $I^{dn}$, one for moving the indicator upward or incrementally as the poise advances outward on the beam and the other for moving the indicator I down or decrementally as the poise advances in the opposite direction or in on the beam.

The actuating devices or motors for the poise and indicator may be provided with ratchet and pawl mechanisms or connections for transmitting their motion to said poise and indicator.

The out-beam motor and the up-indicator motor are synchronously controlled, herein by an out-transmitter unit $T^o$, whereas the in-beam motor and down-indicator motor are synchronously controlled, herein by an in-transmitter unit $T^i$.

The magnets of the beam motors and indicators may be connected by similar circuits with their respective transmitters.

The circuits to the transmitters and motors may be controlled by a starting mechanism S for setting the out-beam motor and up-indicator motor in operation for initiating a weighing operation, said starting mechanism being then locked until the completion of the weighing operation. The poise B may be advanced outwardly on the beam under the step-by-step or beating-up action of the out-beam motor until said poise passes beyond the balance point on the beam, after which the latter drops, as more fully hereinafter described, and completes a circuit to a reversing switch R which breaks the circuit to the out-beam and up-indicator motors and closes a circuit to the in-beam and down-indicator motors. The poise then travels inwardly back to the balance point and the beam rises breaking the circuit to and thereby arresting the in-beam and down-indicator motors. It will be understood, however, that instead of feeding the poise first outwardly and then inwardly, the poise might be fed first inwardly and then outwardly; and that in practice in a weighing operation the direction of the initial feed of the poise may depend on the position of the poise at the end of the preceding weighing operation.

To lock the beam when the poise reaches a position of rest a locking mechanism L is phovided which may be automatically set in operation by the movement of the beam. An unlocking unit $M^u$ is also set in operation by said movement of said beam to unlock the previously locked starting mechanism S. In some instances, as more fully hereinafter described, a time device or mechanism T may be provided for delaying the operation of the beam lock L and the operation of the unlocking unit $M^u$.

The weight indicator may be provided with a shutter O, controlled by a shutter motor $S^m$, said shutter being opened at the commencement of a weighing operation to disclose the indicator reading, automatically closed during such operation, and automatically opened at the end of the weighing operation. The reading of this indicator may be facilitated by an electric lamp Q and the beginning and completion of the weighing operation may be announced by the ringing of a bell V.

The shutter motor, a transmitter circuit switch at the shutter motor, the lamp, bell and the unlocking unit for the starting mechanism may be under the control of the time unit but in case no time unit is used said devices may be under the immediate control of the beam.

To record the reading of the weight indicator I a printing unit W is provided.

Having referred in general to the various instrumentalities comprising the weighing machine embodying the invention, we will now proceed to describe the circuits and connections whereby the coöperation of said instrumentalities is effected.

In making a weighing operation, first the shutter O is opened to reveal the reading of the indicator before starting the weighing operation; the transmitter circuit at the shutter motor $S^m$ is opened; the lamp Q is lighted to illuminate the indicator, and the bell V is sounded to announce the commencement of the weighing operation. To effect the above operations a pair of fixed contacts 7′, 7², (Fig. 1) are provided at the starting mechanism S, the contact 7′ being connected to the main positive line P by a conductor $p$. The contact 7′ is connected by a bridge contact 12 to the contact 7² which in turn is connected to a conductor $p'$ which branches, one branch $p^2$ being connected to a fixed contact 8, at what may be termed a shutter circuit cut-out switch C, said contact 8 being connected in turn through a movable bridge contact 9 to a fixed contact 8′, connected in turn through a conductor $p^3$ with a fixed contact 10 at the time unit T. This contact 10 is connected through a movable bridge contact 11 to a fixed contact 10′ which is connected in turn to the magnet of the shutter motor $S^m$ through the conductor $p^4$.

The conductor $p^4$ is connected with the lamp Q and the bell V by a branch wire $p^5$. The magnet of the unlocking motor $M^u$ is connected to the conductor $p^5$ by the conductor $p^6$.

The magnet of the shutter motor $S^m$ is connected to the main negative wire N by the wire $m$, and the lamp Q, bell V and unlocking motor $M^u$ are connected to the negative wires $m'$, $m^2$, $m^3$ which are connected by a single conductor $m^4$ with the negative main N.

When the bridge contact 12 is connected to the contacts 7′, 7², it will be apparent that through the above circuits the shutter motor $S^m$, the lamp Q, the bell V and the unlocking motor $M^u$ will be connected to the positive line P.

Referring now to the starting circuit for the out-transmitter $T^o$, said circuit comprises a wire $t$ connected to the positive conductor $p'$, said wire $t$ being connected to a contact 13 at the shutter motor $S^m$, said contact being connected with a contact 13′ through the bridge contact 14 in the normal or inactive position of a switch arm 15 carrying said bridge contact and operated by an armature of the shutter motor, more fully hereinafter described. The contact 13′ is connected to a wire $t'$, connected in turn to a contact 16 at an operating handle 5 at the starting mechanism S, said contact 16 being connected to a contact 16′ by a bridge contact 17 which is operated by said handle, as more fully hereinafter described. This contact 16′ is connected to a wire $t^2$ which is connected to a contact 18 at the up-indicator motor $I^{up}$, said contact being connected to a contact 18′ through a bridge contact 19. The contact 18′ is connected to a wire $t^3$ which is connected to a contact 20 at the down-indicator motor $I^{dn}$, said contact 20, in turn being connected by a bridge contact 21 to a contact 20′. The contact 20′ is connected by a wire $t^4$ to a contact 22 at the out-beam motor $M^o$, said contact 22 being connected in turn to a contact 22′ through a bridge contact 23. The contact 22′ is connected by a wire $t^5$ to a contact 24 at the in-beam motor $M^i$, said contact being connected in turn to a contact 24′ through a bridge contact 25. The contact 24′ is connected to a wire $t^6$ which branches, one branch leading to a contact 26 at the reverse motor R, said contact being connected to a contact 26′ through a bridge contact 27. The contact 26′ is connected by a wire $t^7$ to a contact 28 at the in-transmitter motor $T^i$, said contact being connected in turn to a contact 28′ through a bridge contact 29. The contact 28′ is connected to the magnet of the out-transmitter motor $T^o$ by a wire $t^8$ which branches, one branch leading to one of the coils of the out-transmitter magnet and the other branch to the other coil for the out-transmitter magnet, thereby connecting the coils of said magnets in multiple with the positive line.

It will be apparent that this circuit, which may be called the transmitter starting circuit, connects the out-transmitter magnet to the main positive line P through serially arranged switches at the shutter motor $S^m$, the operating handle at S, the up-indicator motor $I^{up}$, down-indicator motor $I^{dn}$, out-beam motor $M^o$, in-beam motor $M^i$ and in-transmitter $T^i$. It will therefore be apparent that unless all of these switches are closed the starting circuit will not be completed to the magnet of the out-transmitter.

The negative circuit for the out-transmitter magnet coils comprises the line $n$ connected to said coils and to a contact 30 at the down-indicator motor $I^{dn}$, said contact in turn being connected to a contact 30′ through a bridge contact 31. The contact 30′ is connected by a wire $n'$ to a contact 32 at the up-indicator motor, said contact in turn being connected by a bridge contact 33 to a contact 32′. The contact 32′ is connected by a wire $n^2$ to the main negative line N.

The negative wire $n$ from the out-transmitter is also connected to a branch $n^3$ connected with a contact 34 at the in-beam motor $M^i$ said contact in turn being connected to a contact 34′ through a bridge contact 35. The contact 34′ is connected by a wire $n^4$ to a contact 36 at the out-beam motor said contact in turn being connected to a contact 36′ through a bridge contact 37. The contact 36′ is connected by a wire $n^5$ to a contact 38 at the operating handle, said contact in turn being connected to a contact 38′ through a bridge contact 38² which is operated by the starting handle. The contact 38′ is connected to the main negative line N.

It will thus be seen that the negative line from the out-transmitter magnet passes through switches at the down-indicator motor, up-indicator motor, and switches at the in-beam motor and out-beam motor, the switches at the indicator motors and beam motors being connected in parallel with the negative line from the out-transmitter motor.

Having described the starting circuit for the out-transmitter motor, we will now describe circuits which are controlled at the out-transmitter motor and which are effective when the latter is operated to connect the magnets of the out-beam motor and up-indicator motor in parallel with the main positive line. These circuits comprise an operating line $o$ which is connected directly to the main positive wire P. This line $o$ is connected to a contact 40 at the out-transmitter motor, said contact being adapted to be connected to a contact 40' through a bridge contact 42 on said armature arm 39. The contact 40' is connected to a holding line $h$ which is connected to one of the magnet coils of said out-transmitter motor. It will be apparent that when the armature of the out-transmitter is rocked by the energization of its magnet the arm 39 will rock, the bridge contact 42 will connect the operating line $o$ with the holding line $h$ and the magnets of the out-transmitter will be energized independently of the starting circuit, thus insuring the maintenance of the energization of said magnets independently of said starting circuit. The rocking of the armature arm 39 will also connect the contact 40 through the bridge contact 42 with a contact 43 which is shorter than the contacts 40, 40', thereby causing the holding circuit to be completed before the contact 43 is connected to the operating line $o$. This contact 43 is connected to a line $o^2$ which branches, one branch $o^3$ leading to the magnet of the up-indicator motor and another branch $o^4$ leading to a contact 44 at the operating handle, said contact 44 in turn being connected to a contact 44' through a bridge contact 45. This contact 44' is connected to a line $o^5$ which branches, one branch $o^6$ leading to the magnet of the out-beam motor and another branch $o^7$ leading to the magnet of the time unit motor. The negative circuit for the magnet of the out-beam motor is completed by the wire $n^6$ connecting said magnet to the wire $n^5$ referred to. The negative circuit for the up-indicator motor is completed by the wire $n^7$ connecting the magnet of said motor to the wire $n^2$.

The bridge contacts 23 and 37 at the out-beam motor are mounted on an arm 46 which is rocked with the armature of said out-beam motor to open and close the circuits at said motor. The bridge contacts 19 and 33 at the up-indicator motor are mounted on an arm 47 adapted to rock with the armature of said motor to open and close the circuits at said motor.

We will now describe the operation of the out-beam motor and up-indicator motor as controlled by the out-transmitter motor through the circuits and switches described. When the operating handle 5 is rocked and closes the circuits at the bridge contacts 17 and 38² the starting circuit for the magnet of the out-transmitter will be completed and said magnet energized thereby causing its armature to rock against the resistance of a spring which normally holds the armature arm 39 in a position to break the contacts at that point. The rocking of the arm 39 first will break the circuit to the in-transmitter at the contact 57 and then will connect the operating line $o$ with the holding line $h$ through the bridge contact 42. This will energize the magnet of the out-transmitter independently of the starting circuit. The continued rocking movement of the arm 39 will cause the bridge contact 42 also to connect the operating line $o$ with the beam motor and indicator line $o^2$, said line branching to connect said motors in multiple with the main operating line. As a result the magnets of the out-beam motor and up-indicator motor will be energized and their armatures rocked simultaneously. This rocking action will cause the switch arm 46 at the out-beam motor and switch arm 47 at the up-indicator motor to break the starting circuit to the out-transmitter motor at the bridge contact 23 at the out-beam motor and at the bridge contact 19 at the up-indicator motor. The starting circuit will be broken at these two points on the initial movements of said armatures. The continued movement of the arms 46 and 47 will cause the breaking of the negative circuit $n$ of the out-transmitter magnet at both the out-beam motor and the up-indicator motor by the movements of the bridge contacts 37 and 33 away from their fixed contacts. The breaking of this negative circuit will cause the deënergization of the out-transmitter magnet and permit the bridge contact carrying switch arm 39 to break the circuit to the magnets of the out-beam motor and up-indicator motor and also to break the holding circuit for the out-transmitter motor, thereby deënergizing the magnets of the out-beam motor and up-indicator motor and permitting their armature actuated switch arms 46 and 47 to be rocked under the influence of springs connected to the armatures of said switch arms to cause the bridge contacts 37, 33 and 23, 19 to engage their fixed contacts and close the starting circuit for the out-transmitter. This will cause the out-transmitter magnet again to be energized and a repetition of the process will follow. By this arrangement the armature of the out-beam motor will be intermittently rocked and through a pawl and ratchet mechanism will advance the poise B along the beam. At the same time the up-indicator motor will receive an intermittent or step-by-step movement in absolute synchronism with the out-beam motor and will drive the indicator causing a change in the reading thereof corresponding to the movement of the poise along the beam.

One of the principal advantages of the step-by-step feed for the poise and the indicator is that the reading on the indicator will always exactly correspond to the position of the poise on the beam. The synchronous movements of the out-beam motor and up-indicator motor are effected by the intermittent energization of the magnets of said motors through the multiple connections of their circuits with the operating line as controlled by the out-transmitter. It will be apparent that the out-transmitter magnet will not be energized or deënergized until both the armatures of the out-beam motor and up-indicator motor have been rocked to their full extents in both directions. If the negative line of the operating circuit for the out-transmitter is broken, for example, at the out-beam motor and not yet broken at the up-indicator motor the magnet of the out-transmitter will continue to be energized until its negative circuit is also broken at the up-indicator motor. The negative circuit for the out-transmitter must be broken both at the out-beam motor bridge contact 37 and the up-indicator motor bridge contact 33 and this breaking must be at the end of the rocking movements of the armatures of said out-beam motor and up-indicator motor under the energization of their magnets. The armatures in rocking under the energization of their magnets effect the advancing strokes of the pawls for the ratchets for transmitting the movements to the poise and indicator. The reverse or spring movements of the armatures of the out-beam motor and up-indicator motor are for causing the pawls to wipe over their ratchets into positions for fresh active strokes. The starting circuit for the out-transmitter motor is not closed until the armatures of the out-beam motor and up-indicator motor are at the end of the movements of their armatures under the action of their springs so that each pawl will be brought back its full distance for the commencement of the next active stroke. Furthermore, the pawl of one will not be advanced before the pawl of the other, since the starting circuit for the out-transmitter motor is not completed until both pawls have been brought entirely back to complete the starting circuit at the out-beam motor bridge contact 23 and the up-indicator motor bridge contact 19.

It will not be necessary to trace the circuits for the in-transmitter, in-beam motor and down-indicator motor, since their circuits and operations are the same as those just described for the out-transmitter motor, out-beam motor and up-indicator motor.

Having described the operation of the beam motors and the indicator motors whereby the operation of the indicator is effected in synchronism with the poise, we will now describe the circuit and connections for automatically stopping the out-beam motor and up-indicator motor and starting the in-beam motor and down-indicator motor after the poise has passed beyond the balance point and is to be returned thereto.

As previously stated, one branch of the wire $t^6$ of the starting circuit leads to the out-transmitter. Another branch is connected to the in-transmitter and comprises a wire $s$ which is connected to a contact 50 on said beam, said contact being adapted to be connected with a stationary contact 51 when the beam drops. The contact 51 is connected by a line $s'$ to one of the magnets of the reverse switch R, shown merely conventionally herein, the negative circuit for said magnet being completed by a wire $n^9$ connected to said magnet and to the negative line $n^5$. The line $s'$ is also connected with a contact 52 at the reverse switch said contact being adapted to be connected to a contact 53 through a bridge contact 54 on a switch arm 55, the latter being adapted to be rocked with an armature of the reverse motor. The contact 53 is connected by a line $s^2$ to a contact 56 at the out-transmitter motor said contact in turn being connected to a contact 56' through a bridge contact 57. The contact 56' is connected by a line $s^3$ to the magnet of the in-transmitter.

The positive wire $t'$ coming from the shutter motor switch is connected to a branch wire $t^9$ leading to a contact 58 at the reverse switch said contact being adapted to be connected to a contact 58' through a bridge contact 59. The contact 58' is connected by a holding line $h'$ to a holding coil of the reverse switch. The negative circuit for this holding coil is completed by a line $n^{10}$ connecting said magnet with the negative line $n^5$.

When the poise is moved outwardly on the beam under the action of the out-beam motor sufficiently to cause the beam to drop, the beam contact 50 will engage the fixed contact 51 connecting the operating coil of the reverse magnet with the positive starting line $t^6$. The energization of the reverse magnet will cause the rocking of the armature of said magnet and with it the arm 55. The movement of this arm will first connect the holding circuit $h'$ with the positive line $t^9$ through the bridge contact 59 causing the energization of the holding coil of the reverse magnet. The switch arm will thus maintain the closing of the switch arm 55 independently of the energization of the operating coil through the beam contacts 50, 51. This is of importance since if, for any reason, the beam should rise again and separate the contacts 50, 51, the switch 55 will still be in its closed position.

It will be observed that the contacts 58, 58' are longer than the contacts 52, 53. As a result of the holding circuit will be completed, before the circuit to the in-transmitter. When the arm 55 is rocked the bridge contact 27 will be moved away from the contacts 26, 26' breaking the starting circuit to the out-transmitter. It will be understood, however, that if the armatures of the out-beam motor and up-indicator motor have just commenced the advancing of their pawls one step, that step will be completed before their motors will be stopped. This is true since the breaking of the starting circuit does not effect the breaking of the negative circuit for the out-transmitter motor. This breaking of the negative circuit for the out-transmitter motor occurs only when both the armatures of the out-beam motor and up-indicator motor have advanced to their full extents.

The poise B will now move in on the beam by the beating-up action of the in-beam motor and the reading of the indicator will be changed by the synchronous down-beating of the down-indicator motor until after the balance point of the beam is reached when the beam will rise and separate the contacts 50, 51, thus deënergizing the operating coil of the reverse switch. The holding coil of the reverse switch, however, will remain energized and prevent the switch from breaking the circuit at this point. The contacts 50 and 51 in separating break the positive circuits $s'$, $s^2$ to the in-transmitter and cause the arrest of the in-beam motor and down-indicator motor.

Immediately after the weighing operation was initiated by the rocking of the operating handle 5, it will be remembered that said handle was locked. The rocking of said handle also opened the switch C which deënergized the shutter motor, thereby closing the starting circuit for energizing the magnet of the out-transmitter motor and breaking the circuit to the lamp, bell and unlocking the motor. The breaking of the circuit by the rising of the beam, in addition to arresting the in-beam motor and down-indicator motor, closes the circuit to the shutter motor, the lamp, bell and unlocking motor and breaks the starting circuit to the transmitter motors; and breaks the holding circuit to the reverse motor R the unlocking motor $M^u$ tripping a trigger which locks the beam L. The energizing of the shutter motor opens the shutter permitting the indicator reading to be observed, lights the lamp, sounds the bell, unlocks the operating handle, permitting the latter to be rocked to its original position. This rocking of the handle, through connections to be described, prints the indicator reading at the printing mechanism W. A weighing operation or cycle is then completed.

It is sometimes desirable or required to permit a predetermined interval, such for example as three seconds, to elapse after the poise has been arrested before the operating handle is unlocked, the shutter opened and the beam locked. To this end the time unit T is provided, having a beating action similar to that described for the beam motors. This time unit is adapted to move the bridge contact 11 for closing the shutter circuit $p^3$, $p^4$, thereby completing the circuit to the shutter motor, the lamp, the bell and the unlocking motor. This contact, however, is not closed immediately on the energization of the time unit but after a predetermined interval has elapsed, such interval being effected by a device more fully hereinafter described. To complete the shutter motor circuit the latter must also be closed at the shutter motor cut-out switch C, said switch having been opened when the operating handle was rocked to start the weighing operation. The bridge contact 9 at the shutter cut-out is adapted to be connected with the contacts 8, 8' by a release motor $M^r$, (Fig. 1), said motor being controlled at the time mechanism. The magnet of said motor is connected to the shutter motor circuit wire $p^2$ by a wire $r$. The negative side of this motor is connected by a wire $r'$ to a contact 60 at the time switch motor, said contact 60 being connected to a contact 60' through a bridge contact 61 on an arm 62 adapted to be rocked by the armature of the time switch motor. The contact 60' is connected to the negative line $n^5$ by the line $r^2$.

The time device T, it will be remembered, is connected in the same circuit with the operating line $o^5$ which is controlled by the out-transmitter and said time device will therefore have a beating-up action similar to that of the out-beam motor and in-beam motor, such action occurring, by the arrangement of wiring shown herein, when the out-transmitter magnet is originally energized. It will be understood, however, that the beating-up action is only necessary when the poise on the beam is approaching a position of rest. As soon as the time motor armature begins to beat up, the time switch arm 62 will rock causing the bridge contact 61 to close the negative circuit of the releasing motor $M^r$, the energization of the latter tripping a trigger to be described hereinafter, permitting the bridge contact 9 to close the shutter circuit at the contacts 8, 8'.

The shutter circuit is now open only at the time switch bridge contact 11. After the poise has reached the point of balance and the motors have been stopped, the magnet of the time device will no longer be energized and as a result its armature will be rocked slowly under the action of its delay device until at the end of a predetermined period. The bridge contact 11 then will engage the contacts 10, 10', thereby closing the armature circuit and causing the opening of the shutter, the lighting of the lamp, the ringing of the bell, the unlocking of the operating handle, and the locking of the scale beam. The operating handle may then be rocked to the right to permit the printing of the reading on the indicator, the handle by this movement returning to its normal position.

It frequently happens that among other things the cutting of the scale platform by trucks or the accumulation of dirt thereon will make the platform lighter or heavier and thus necessitate calibration. The invention also contemplates the provision of means whereby the indicator may be operated independently of the beam motors, as for calibrating the scale. This operation is usually made by an adjuster or inspector and it is desirable that the calibrations should be made by him alone. He is therefore provided with a separate key which is adapted to turn a lock which will permit the operating handle to be rocked for initiating a weighing operation as before. A weighing cycle having been completed with no load will show whether or not the indicator reads zero. After the completion of said weighing operation, the indicator may be adjusted independently of the poise to correct for any inaccuracy shown by the above operation.

To operate the indicator independently of the rest of the mechanism for the above or other purposes, the indicator motors are provided with independent circuits which may be closed while the circuits to the beam motors remain open. These independent circuits are controlled at the starting mechanism S (Fig. 1) and comprise a common contact 65 which is connected to the main positive wire P by a wire $i$, connected in turn to the wire $p'$; the latter being connected to the wire $p$ by the bridge contact 12, said wire $p$ being connected to the main P. Said common contact may be moved to engage a contact 67 for closing the circuit to the down-indicator motor $I^{dn}$. This circuit comprises a wire $i'$ connected to said contact 67 and to the wire $s^2$ referred to, which is connected to the contact 56 at the out-transmitter, said contact in turn being connected to the contact 56' through the bridge contact 57, thence through the line $s^3$ to the magnet of the in-transmitter.

The common contact 65 may be moved out of contact with the in-transmitter contact 67 and engage a contact 68 which is connected in the circuit for the up-indicator motor $I^{up}$. This circuit comprises a contact 68 adjacent the common contact 65, and is connected by a wire $i^2$ to the contact 28 at the in-transmitter motor, said contact being connected to the contact 28' by the bridge contact 29, the contact 28' leading to the magnet of the out-transmitter motor through the line $t^8$.

The energization of either the out-transmitter or the in-transmitter by connecting the positive wire P to the circuits just described will cause the beating-up action of either the up-indicator or the down-indicator motor. The beam motors, however, will not be operated since their circuits are broken at the operating handle at this time as more fully hereinafter described.

To prevent tampering or any interference with the instrumentalities above referred to, they may be all inclosed within a casing 1 (Fig. 3) having a cover 2 which may be locked by any suitable lock (not shown).

Having outlined the principal instrumentalities of the machine and their functions, electric and other connections, said instrumentalities will now be described more in detail.

Referring first to the starting mechanism conventionally represented at S in Fig. 1, this mechanism comprises a handle shaft 4 (Figs. 1, 3, 14, 15, 18 and 19) journaled in bearings in spaced upright plates $4^a$, $4^b$, and $4^c$ (Fig. 14) mounted on a shelf $4^s$ in the casing 1. One end of this shaft is provided with a squared reduced end (Fig. 19) abutting against a similar end of a short shaft $4^d$ journaled in a boss in a lock plate 3 on said casing 1, said shafts 4 and $4^d$ being connected by a coupling $4^e$. On the shaft $4^d$ is secured the operating handle 5 referred to.

The lock plate 3 carries two locks, one on each side of the operating handle, the tumbler cylinders of said locks being conventionally shown at 6. As stated the weigher or operative who conducts the normal weighing operations is provided with a different key for controlling the locking mechanism from the adjuster or inspector. The left hand lock is used by the weigher, said lock being provided with a key-hole $6^w$ (Figs. 3 and 18). The inspector's or adjustor's lock at the right of the handle 5 is provided with a key-hole $6^a$, the mechanism operated by said adjuster being more fully hereinafter described.

Referring now to the mechanism operated by the weigher's lock, this lock is connected to a coupling $6^b$ (Fig. 19) having a squared end received by a similarly shaped recess in the end of a shaft $6^d$ journaled in the plates $4^a$ and $4^c$ (Fig. 14). Fixed on this shaft $6^d$ is a disk or member $6^e$ (Figs. 1 and 15). Secured to this disk is a smaller disk $6^f$ (Fig. 14) of insulation material, carrying the bridge contact 12, said contact as previously stated being adapted to be connected to the fixed contacts $7'$, $7^2$, the latter herein being secured to a stationary disk $6^g$ of insulation material, secured to said plate $4^c$. It will be apparent that when the disk $6^e$ is turned to the left from the position shown in Fig. 15 to the position shown in Fig. 16 the bridge contact 12 will be connected to the fixed contacts $7'$, $7^2$, on the shutter motor circuit. To prevent the operating handle 5 from being rocked before this switch has been closed, a lever 7 (Fig. 15) is secured to said handle shaft 4, said lever having a pin $7^a$ which is held between the periphery of the disk $6^e$ and a stop pin $7^b$ in said plate $4^c$. To permit said handle to rock and close the handle controlled contacts 17, 45, $45^1$ and $38^2$ of the transmitter starting circuit, out-beam motor circuit, in-beam motor circuit and negative line of the transmitter starting circuit, respectively, as hereinbefore described, said disk $6^e$ is provided with a radial slot $6^s$ which, when said disk is turned to connect the bridge contact 12 with the contacts $7'$, $7^2$ of the shutter motor circuit, will permit the pin $7^a$ to enter said radial slot $6^s$ and the handle 5 to be rocked to the left. To limit the turning movement of said disk $6^e$ a stop $6^h$ is secured thereon adjacent the slot $6^s$ and is adapted to engage the lever pin $7^a$.

The detail of the switch for closing the contacts 17, 45, $45^1$ and $38^2$ will now be described, referring more particularly to Figs. 14, $14^a$ and 20. This switch (Fig. 14) comprises the contacts 16, $16'$, 44, $44'$, $45'$, $45^2$ and 38, $38'$ (Fig. 1) herein in the form of two rows of bolts 70, $70'$, entered vertically through blocks 71 (Fig. $14^a$) of insulation material, said blocks being spaced one from another by strips 72, also of insulation material. These blocks are secured together by a pair of horizontal bolts 73 projecting through said spacing blocks and are secured to said plate $4^a$ by bolts $73^a$. Each of the contacts 70 is connected to a U-shaped contact strip 74 embracing a spacing block 71, the base of each of said U-shaped strips 74 being connected to its contact 70 by the engagement of a nut 75 on said contact with the base of the said strip. The depending fingers of said U-shaped strip are bent inwardly toward one another to form opposed inturned ends which are adapted to receive between them a contact knife 78. Four contact knives are shown herein corresponding to the bridge contacts 17, 45, $45'$ and $38^2$ (Fig. 1). These contact knives are spaced one from another by suitable blocks 79 (Fig. $14^a$), said blocks and knives being secured together by horizontally disposed bolts 80. Ends $78^a$ of said knives 78 always engage the contacts $70'$ while their opposite ends are adapted to be rocked into or out of engagement with the contacts 70. To this end said knives are fixed on a rocking shaft 76 journaled in spaced plates 77 carried by the block supporting bolts 73. The rocking of the knife carrying shaft 76 is effected by a crank 81 secured to the shaft 76 said crank being connected to one end of a link 82, the opposite end of which is connected to a crank 83 on said handle operated shaft 4.

To prevent the operating handle from being rocked back to its normal position after it has once been rocked to close the switch just described, there is provided a locking dog 84 (Figs. 20, 21 and 22) on a stud $84^a$ projecting from the plate $4^a$ (Fig. 14), said dog being normally pressed toward said handle operated shaft 4 by a spring $84^b$ connected to the tail of said dog. Secured to the handle operated shaft 4 is a short arm 85 having a notched end $85^a$ which is adapted to be engaged by the end of said dog 84 when the handle shaft is rocked from the position shown in Fig. 20 to that shown in Fig. 21, thereby preventing rocking movement of the shaft 4 in a clockwise direction back to its normal position prior to the unlocking of said dog.

As previously stated the operating handle is not unlocked until the end of a weighing operation. The unlocking of said dog is effected by the unlocking motor represented diagrammatically in Fig. 1 at $M^u$. This motor comprises a pair of magnet coils 86 mounted on the legs of a yoke $86^y$, said yoke being secured to the plate $4^a$. Between the coils of this magnet is an armature shaft $86^a$ journaled at one end in a plate $86^b$ (Fig. 14) secured to the poles of said magnet and at its opposite end at the plate $4^a$. Secured to this shaft is a rocking armature $86^c$ which is adapted to rock toward the poles of said magnet when the latter is energized and is rocked in the opposite direction by a spring $86^s$ when said magnet is deënergized. One end of this armature shaft projects beyond the plate $4^a$ to receive a crank $86^d$ (Figs. 14 and 20). On the end of this crank is pivoted a horizontally extending unlocking hook lever $86^h$, said hook being normally rocked upwardly by a spring $86^e$ connected at one end to a short end of said hook and at its opposite end to the crank $86^d$.

The hook end of said lever is received by a slot in a flange $84^c$, projecting laterally from an edge of said locking dog 84, referred to. It will be apparent that when the unlocking motor magnet is energized its armature $86^c$ will be rocked to the right (Fig. 20) and its hook end will engage the flange $84^c$ of said locking dog, thereby rocking the latter against the resistance of its spring and out from the notched end $85^a$ of the short arm 85 on the handle operated shaft 4, thereby permitting the handle to be rocked back to the right to its normal position. By this movement of the handle the bridge contact knives 78 are rocked out from engagement with the row of contacts 70 opening the starting circuit for the out-transmitter and the operating circuits for the beam motors.

The operating handle when rocked to the left for initiating a weighing operation, as previously explained, breaks the shutter motor circuit, thereby closing the shutter and breaking the circuit to the lamp, bell and unlocking motor.

Referring now to the shutter circuit cut-out switch C and connections to the handle shaft whereby the circuit is broken under the aforesaid operation of said shaft, loosely mounted on the stud shaft 84$^a$, which carries the locking dog for the operating handle, is a disk 87 (Figs. 14 and 21) of insulation material, carrying the bridge contact 9 shown in Fig. 1, said bridge contact being adapted to connect the contacts 8, 8', which are connected in turn to the wires of the shutter motor circuit. These fixed contacts are secured to a disk or plate 87$^c$ which is secured to the plate 4$^a$. The bridge contact carrying disk 87 is normally rotated in a clockwise direction to cause the bridge contact 9 to engage the fixed contacts 8, 8' by a spring 87$^s$. (Fig. 20). When the operating handle is rocked to the left to close the starting circuit and motor operating circuit as on the initiation of the weighing operation, this movement of the handle is adapted to rock the disk 87 in a clockwise direction to disconnect the bridge contact 9 from the fixed contacts 8, 8'. This is effected by the rocking of the locking dog 84 from its position in Fig. 20 to its position in Fig. 21. To this end a trigger 88 is pivoted on said dog by a pin 88$^a$ and is pressed by a spring 88' normally against a stop pin 88$^b$ also on said dog. When in this position said trigger is adapted to abut against a pin 88$^c$ projecting laterally from said bridge contact disk 87. As a result when the dog rocks to the left the end of the trigger 88 engages the pin 88$^c$ and rocks the bridge contact disk 87 in a contra-clockwise direction causing the bridge contact 9 to be separated from the fixed contacts 8, 8' as well shown in Fig. 21.

It will be remembered that in initiating a weighing operation the unlocking motor M$^u$ is energized when the shutter motor circuit is closed by turning the weigher's key in the key hole 6$^w$, but to no purpose at this time. Said motor will continue to be energized until the shutter motor circuit cutout switch C (Fig. 1) is opened to break the shutter motor circuit. As stated, this switch is opened by the rocking of the handle locking dog 84 to the left. This takes place when the handle is rocked to the left and the dog drops into the notched end 85$^a$ of the short arm 85. It will be apparent that if the hook lever 86$^h$ is drawn to the right (see position, Fig. 20) as when the unlocking motor M$^u$ is energized, its hook end would be up to prevent the locking dog 84 from turning to the left to be effective to lock the handle and open the switch C. To prevent interference with the locking movement of said locking dog the short arm 85 on the shaft 4 is provided with a pin 84$^p$ which engages an extended end of said hook lever (Fig. 20) and rocks the latter down sufficiently to permit the dog flange 84$^c$ to rock over said hook and engage or lie against the end of the short arm 85 (Fig. 20) so that when the short arm 85 is rocked to the left the locking dog 84 will be free to spring into the notched end 85$^a$ of said short arm 85 to lock the shaft 4. After the operating handle is rocked to the left the pin 84$^p$ will be up way from the end of said hook lever 86$^h$, thereby permitting the latter to be pressed up by the spring 86$^e$ into position to pull the dog 84 to the right to subsequently unlock the handle as described.

After the poise has come to a position of rest the shutter motor circuit cannot be closed to open the shutter, lock the beam, unlock the handle, ring the bell and light the lamp until said circuit is closed at the cut-out switch C. To trip the dog 88 to permit the disk bridge contact 9 to be rotated in a clockwise direction by the spring 87$^s$ to close said switch C, a release motor previously referred to and represented in the diagrammatic view in Fig. 1 as M$^r$ is provided. This motor (Figs. 14, 20, 21 and 22) comprises a pair of coils 89 mounted on the poles of a yoke 89$^a$, which are secured to the plate 4$^a$. Between the coils of this motor is an armature shaft 90, journaled at one end in a plate 90$^a$ secured to the poles of the magnets of said motor and at its opposite end in the plate 4$^a$. Secured to this shaft is a rocking armature 91 which, when said magnet is energized, is rocked, herein in a contra-clockwise direction (Fig. 21). On said armature shaft 90 is a trip arm 92 carrying adjacent its outer end a trip pin 93 which, when said armature is rocked, is adapted to engage the tail of the trigger 88, rocking the latter and permitting the spring 87$^s$ to turn the bridge contact disk 87 and close the switch C of the shutter motor circuit.

It will be understood that by the arrangement of circuits for the time switch T described herein, the release motor M$^r$ is energized and the switch C of the shutter circuit is closed, when the time-switch commences its beating action, but the shutter motor circuit will not be closed until the bridge contact 11 at said time switch is connected to the contacts 10, 10'.

The unlocking motor M$^u$ not only is utilized for unlocking the operating handle after the poise has reached a position of rest, but also is utilized for tripping a trigger which sets in operation the beam lock. The locking mechanism for the beam will be first described, and then the trip operated by the unlocking motor for permitting the operation of said beam locking means.

Referring more particularly to Figs. 5 and 12, this locking means, as shown herein, comprises a pair of clamping fingers 103, the upper ends of which are adapted frictionally to engage the opposite sides of the beam 151 (Fig. 5) adjacent the outer end of the latter. These fingers are fulcrumed at points between their ends on studs 103$^a$ projecting laterally from a standard 104, which is apertured at 104$^a$ to receive the end of the beam 151, the movements of the latter being limited by the ends 104$^c$ of said slot. The fingers 103 may be rocked toward or from one another to pinch said beam between them or to release the same through toggle links 105 (Fig. 12) pivoted to the lower ends of said fingers 103 and to a common link 107. This link is provided adjacent its lower end with an elongated slot 107$^a$, which receives the end of a crank 109, the latter being secured to a rocking shaft 111 journaled in a U-shaped support 113. This shaft 111 is provided with a short actuating crank 115, adapted to be rocked to the left of Fig. 5 by a spring 117 secured at one end to said crank 115 and at its opposite end to a fixed stud 119. The rocking of the shaft 111 under the action of said spring forces the common link 107 vertically upward and through the links 105, spreads the lower ends of the fingers 103 and presses their upper ends into intimate engagement with said beam, thereby locking the latter in its balanced position.

When the load is removed from the platform of the scale, and the poise remains at its point of rest reached in the last weighing operation, the increased weight brought to bear upon said fingers might be too great to be frictionally sustained by said fingers and the beam might sink gradually and connect the beam contacts 50, 51. To prevent any possibility of such an occurrence, the downward movement of the beam may be limited by providing the beam with stops 121 (see Fig. 12) which, when the beam is moved a predetermined distance will engage shoulders 123 in the upper ends of said finger and thereby limit the drop of the beam.

When the beam is once locked in position as by said fingers, the beam cannot again be unlocked until the operating handle 5 has been thrown to the left to start a new weighing operation, and after said handle has been thrown to the right for printing the weight indicated by the indicator I for the last weighing operation. This insures a record of each weighing operation before a new weighing cycle is started. During the travel of the poise the beam is of course unlocked and the fingers 103 are held away from the beam by connections with the operating handle which will now be described. The handle shaft 4 is provided (Figs. 20 and 21) with a crank 125 connected to one end of a connecting rod 127, the opposite end of said rod being connected to a crank 129 loosely mounted on the shaft 111 and at one side of the spring actuated short crank 115 referred to. The crank 129 is provided with a trip pin 142 projecting laterally therefrom and in position to engage the edge of the short crank 115. When the operating handle is rocked to the left to initiate a weighing operation the crank 129 is rocked to the right from the position shown in Fig. 20 to the position shown in Fig. 21, its pin 142 engaging the edge of the crank 115 causing the latter to rock, against the resistance of its spring 117, and draw the beam locking fingers out of engagement with the beam arm 151. After the poise has reached a position of rest in a weighing operation, the beam, as stated, is automatically locked. This is effected by tripping the pin 142 by the energization of the unlocking motor M$^u$. This tripping of the pin 142 is effected herein by rocking the latter up beyond the end of the short crank 115, thereby releasing said crank to the action of its spring 117, which then is free to draw the locking fingers 103 into engagement with said beam. To permit the pin 142 to be rocked beyond the end of said short crank 115 as described, said pin herein is mounted on a V shaped lever 145 one leg of which is pivoted on a pin 139 on the handle operated crank 129. This V lever is normally rocked to press against a stop pin 145$^a$ also on said crank 129 by a spring 149, one end of which is connected to the pivoted end of said lever, while its other end is connected to a stud on said crank 129. When the latter is rocked to the right to cause its pin 142 to engage and rock the short crank 115 to the right to unlock the beam, the V lever pin 142 will be held to its work by its tendency to rock into engagement with the stop pin 145$^a$. To permit the unlocking motor M$^u$ to rock the pin 142 to release the crank 115, the armature shaft 86$^a$ of said motor is provided with a trip arm 133 having at its free end a trip pin 135. With the parts positioned as in Fig. 21 the energization of the unlocking motor will rock the arm causing its pin 135 to engage a pin 137 and rock the pin 142 of the V lever 145 up beyond the short crank 115, thereby releasing the latter and locking the beam. To permit the crank 129 to be rocked to the left, to bring its pin 142 at the left of the shaft crank 115 in readiness to rock the latter again to the right to unlock the beam, without interference from the trip pin 135, the pin 137 engaged by the latter is not directly mounted on the V lever 145 but is on a supplemental lever 138 (Fig. 20a), pivoted between its ends also on the pin 139 carrying said V lever. This lever 138 is provided with a tail end 141 which is normally pressed against the pin 142 by a spring 143 connected at one end to said tail end and at its opposite end to a stud on said V lever 145. It will be apparent that when said supplemental lever 138 is pressed in one direction by the pin 135 it will be effectual to rock said V lever and trip the pin 142, but will be free to rock in the opposite direction and permit the V lever 145 and crank 129 to pass said unlocking pin 135 into the position shown in Fig. 20.

Referring now to the construction of the scale beam (Figs. 2 to 8 inclusive) this beam referred to in the diagrammatic view Fig. 1 as A, comprises a long arm 151 (Fig. 5) and a short arm 153, said beam being fulcrumed between its ends by knife edged trunnions 155 mounted in a boss 155a on said beam, said trunnions resting in hardened steel bushings 157 in apertures adjacent the upper ends of uprights 159 on a base plate 160 (Figs. 4 and 7) mounted on the tops of two spaced columns 161. The end of the short arm 153 of the beam is provided with a boss 162 carrying knife edge trunnions 163 received by bushings 165 near the upper ends of a link 167 (Figs. 3 and 5) the lower end of the latter being connected to the upper end of a rod 169, the opposite end of said rod being threaded into a counterweight 170 (Fig. 3) which in turn is threaded into one end of a rod 169a, the opposite end of the latter being connected to the upper end of a link 171. The lower end of said link carries bushings 172 adapted to receive knife edge trunnions 172a carried by a block 173. This block is connected to a shelf lever comprising herein spaced rods 174 having ends secured in said block 173 and other ends secured in a similar block 175. The block 175 carries knife edge trunnions 176 received by bushings 176a carried by a link 177, the upper end of which is connected to the lower end of a rod 178, the upper end of the latter being threaded into the lower end of a turn-buckle 179. The upper end of said turn-buckle may be connected to the platform of any suitable scale by a vertical connecting rod 180, the lower end of which is threaded into said turn-buckle. To prevent any tampering with said rod it may be inclosed by a tube 181 extending upwardly from the top of the casing 1. Said shelf lever is fulcrumed between its ends and for this purpose is provided with a block 182 apertured to receive said rods 174, said block being adapted to slide along said rods and be held in its positions of adjustment by any suitable device, herein by a set screw 182a. The block 182 carries bushings 183 which receive knife edge trunnions 184 on a shackle 185. This shackle is adjustably held at its lower end by spaced plates 186, 186a, which may be clamped against a bolt 187 at the lower end of said shackle by suitable bolts 188.

By the adjustment of the block 182 and shackle 185 the leverage of said shelf lever may be varied as desired. The varying of this leverage is one of the important features of this invention and is provided to cause an increment of movement of the poise to correspond to an increment of weight on the scale platform. For example, if the poise is advanced by pound increments when one pound is placed on the scale platform the beam should balance when the poise is advanced one increment. By this arrangement if the beam is of a length to weigh, for illustration, 1000 pounds, the poise may be given 1000 even unitary beats.

Referring now to the mounting of the poise on the beam and the connections whereby said poise is caused to travel along said beam, herein said poise shown in the diagrammatic view at B, straddles the beam A and is guided thereby. Said poise is supported on a screw shaft 194, extending longitudinally of and above said beam and journaled at its opposite ends in ball bearings in brackets 195 projecting upwardly from said beam. The poise is caused to travel along the beam A by the rotation of said screw shaft 194. This rotation is transmitted to the poise by the engagement of the threads of said screw with a threaded sleeve 197 (see Fig. 6) rotatively mounted on a shaft 199 secured within said poise, said threaded sleeve being prevented from longitudinal movement relative to said poise by a collar 201 fixed to said shaft. It will be observed that this threaded sleeve is mounted within said poise above the screw shaft 194, and is adapted to rest thereon and contributes to the support of the poise. The poise is further supported by similar threaded sleeves 203. These sleeves, however, are not prevented from longitudinal movement but are free to slide on their supporting shafts and merely constitute supports for the poise and not transmission means for effecting the travel of said poise along said screw shaft.

Having described the mounting of the poise and its screw shaft, the connections from the out and in beam motors will be described.

These out and in motors (Fig. 5) are mounted in a casing 209 carried on a yoke seat 210 in the long arm of said beam and adjacent the fulcrum of said beam. Said motors are similar in construction and therefore a description of one only is necessary.

Referring more particularly to Figs. 9 and 11, each of these motors comprises upper and lower magnet coils 205 mounted on posts projecting laterally from a plate 207 secured within said casing 209. Between the coils of each of these motors is a shaft 211 journaled at one of its ends in said standard 207 and at its opposite end in a plate 208 secured to the ends of the poles of said magnet coils. Secured to each shaft 211 is an armature 213 which is adapted to be rocked toward the poles of said magnets under the energization of the latter, and in the opposite direction by a spring 215 when said magnets are deënergized. The latter movement of said armature is limited by an adjustable stop 216. The pole pieces of the magnets 205 are cut away (see Fig. 11) to allow the armature to swing into line with the field of the magnets when the latter are energized.

The intermittent rocking of said armature is utilized to give the poise the step-by-step or incremental feed referred to. To transmit this movement to the poise screw shaft 194, said armature shaft is provided with an arm 217 (Figs. 9 and 10) for actuating a pawl and ratchet mechanism comprising a toothed ratchet wheel 219 fast on a shaft 194$^a$ journaled in the plates 207 and in line with said screw shaft 194. This ratchet is adapted to be engaged by a pivoted pawl 220 the latter having a notch 221 formed on its inner edge corresponding in shape to the ratchet tooth. The pawl is pivotally mounted at 223 upon an oscillating support 225 the latter being formed by V-shaped plates between which the pawl is pivotally held, the plates being mounted to swing about the shaft 194$^a$. The opposite end of the pawl is connected to one end of a link 227 the opposite end of which is connected to the lever arm 217. A locking dog 229 is pivoted at 231 upon a frame plate 233 secured to the plate 207. Said locking dog rests against a tooth and normally prevents advance movement of the ratchet and the screw shaft. The in-motor is provided with similar ratchet connections for advancing the poise screw shaft in the opposite direction, said mechanism including a locking dog which prevents movement of said shaft in the opposite direction to that of the ratchet wheel 219 for the out-motor shaft and under present consideration. A spring 235 normally draws the locking dog against the ratchet, the spring being secured to the frame plate 233. The locking dog has a projecting end 237 which rests against the inner edge of the pawl 220 and as the latter is moved to engage a tooth it withdraws the dog from the ratchet. The ratchet, however, is not released by the dog until the pawl has positively engaged its adjacent tooth. When the ratchet has moved far enough to allow the dog to slip into the next notch said dog moves into the same thereby preventing movement of the ratchet for more than one notch at a time.

To prevent feeding movement of the pawl without movement of the ratchet or to prevent movement of the ratchet on a partial feeding only of the pawl there is provided a lug 239 on the inner face of the pawl and projecting toward the plate 233, which lug in the inactive position of the pawl (see Fig. 10) abuts against the end of a swinging gate arm 241 and is prevented thereby from feeding movement without first moving the ratchet to engage a tooth. On movement of the actuator arm 217, therefore, the pawl is first swung inwardly about its pivot 223 until said pawl engages the ratchet after which the actuating arm 217 then swings the pawl with its oscillating support 225 as a unit in a clockwise direction, the lug 239 passing freely within a guiding plate or flange 243 during such movement.

On completion of this movement the lug 239 emerges from the control of the flange 243 and release of the pawl can then take place on backward movement of the actuator arm 217. When this occurs the pawl first swings outwardly about its pivot 223 disengaging from the ratchet and bringing the lug 239 on the outside of the guiding flange 243, in which position the lug and flange prevent the pawl from again engaging with the ratchet until fully restored to its initial position as represented in Fig. 10. On such return movement the gate member 241 which is normally held against the guiding flange 243 by a spring 245, springs out to allow the lug to pass between it and the flange.

From the foregoing description, therefore, it will be apparent that on the energization of the magnets 205 the armature 213 will be rocked and with it its shaft 211 and the pawl actuator arm 217, thereby moving the actuating pawl to move the ratchet and rock the poise screw shaft an increment.

The ratchet connections for the in-motor are similar to those described for the out-motor with the exception that the ratchet and pawl are arranged oppositely to the arrangement for the in-motor whereby under the action of the latter the poise screw shaft is rotated in an opposite direction.

The rocking of the beam motor armature shafts, as previously stated, also controls switches at said motors. The motors and switches being similar, it is necessary to describe one only. The operating connections for the switches at the out-beam motor $M^o$ will now be described. For the control of these switches the armature shaft 211 is provided with a lever comprising a long arm 247$^a$ and a short arm 247$^b$. The long arm operates the bridge contact 23 (Fig. 1) referred to in the description of the wiring connections. To this end said arm 247ª is provided with a pin 248 occupying a slot 248ª in a disk 248ᵇ of insulation material, said disk being rotatively mounted on a stud 248ᶜ secured to the pole of one of the magnet coils 205. This disk carries the bridge contact 23 and when rocked causes said bridge contact to be connected or disconnected with the fixed contacts 22, 22' (Fig. 1), the latter being mounted on a disk 248ᵈ of insulation material, said disk being secured to the plate 208.

The short arm 247ᵇ similarly operates the bridge contact 37 mounted on a disk 251 similar to that described, said bridge contact being adapted to be connected or disconnected with the fixed contacts 36, 36', on a fixed disk of insulating material, when said disk 251 is turned.

By the mounting of the bridge contacts 23, and 37 on the long arm 247ª and short arm 247ᵇ respectively, the negative circuit for the out-transmitter motor is broken at the contacts 36, 36', at the end of the stroke of the armature 213 and the starting circuit for the out-transmitter is closed at the end of the stroke of said armature under the action of the spring 215. This make and break control, as previously stated, is of importance in maintaining the synchronous step movements of the beam motors and indicator motors.

The pawl and ratchet driven shaft 194ª may be connected to the screw shaft 194 by an insulated connection comprising opposed cranks 261 and 263 (see Figs. 9 and 10), secured to the ratchet shaft 194ª and the screw shaft 194, respectively, the crank 261 being bifurcated at its outer end to form guides for receiving a cross-head 265 which is apertured to receive a crank pin 267 secured to the end of said crank 263, said crank pin being insulated from said cross-head by a bushing 269 of insulating material to prevent any possibility of the transmission of current from the motors to the poise actuating screw.

To prevent any interference with the balancing of the beam by the electric wires leading to the beam and the beam motors, a contact carrying plate 271 (Figs. 7 and 8) is secured to the top of said beam and projects laterally to one side thereof, said plate being apertured to receive herein six contacts 273, which are insulated from said plate by a fiber strip 275 on the top of said plate and by flanged bushings 277 adjoining the under side of said plate. These contacts 273 are retained in position by suitable nuts 279 threaded on said contacts above and beneath said plate 271. The depending ends of these contacts 273 are adapted to be immersed in stationary mercury cups 281 which are carried by a bracket 283 secured to the column standard 159 referred to. Projecting from the bases of the cups 281 are contacts 285 which are secured to the bracket 283 and insulated therefrom in a manner similar to that described for the contacts 273. The cups 281 are sufficiently large to permit the upper contacts 273 to swing freely therein without hindrance to or in any way affecting the free balancing movements of the scale beam.

Referring now to Figs. 24 and 25, I will describe more in detail the construction of the transmitter motors or units represented in the diagrammatic view (Fig. 1) at Tº and T¹ and as stated are used for effecting the beating and synchronous action of the beam and indicator motors. As the transmitters are similar in construction a description of the out-transmitter will be sufficient. This transmitter comprises (Fig. 24) spaced magnets 287 mounted on a plate 288 which may be placed or secured within the casing as desired. Between said magnets is an armature shaft 289 journaled at one end in said magnet plate 288 and at its opposite end in a plate 290 secured to the poles of said magnets. Fast on said armature shaft is a rocking armature 291 which is rocked toward the poles of said magnets when the latter are energized and is rocked in an opposite direction by a spring 293 when said magnets are deënergized, such movement being limited by a stop 294 on the plate 290. As previously stated, the rocking of said armature connects or disconnects the bridge contacts 42 and 57 (Fig. 1) with their adjacent fixed contacts 40, 40', 43 and 56, 56' respectively, These contacts herein are held on spaced plates 295, apertured to receive posts 295ᵖ extending between and secured to said plates 288 and 290, said plates 295 being held in their spaced relation by spacing sleeves 295ᶜ. The bridge contacts 42 and 57 are carried by the yoke arm 39 secured to the armature shaft 289. The bridge contact 42 may be a carbon roller (Fig. 25) rotatively mounted on a shaft 297 secured to said yoke arm by a pin 297ª and insulated therefrom by a suitable flanged bushing 42ᵇ. A carbon roller such as described presents a very advantageous construction since each time it engages its adjacent contacts or brushes it does not rub past said contacts, but rotates freely into engagement therewith and at each succeeding operation presents a different portion of its surface to said contacts, reducing the wear thereon and preventing sparking.

The shaft 297 projects beyond the yoke arm 39 and receives the bridge contact 57 for the contacts 56, 56', said bridge contact being herein in the form of a brass tube. Herein the contacts 56, 56' extend beyond the contacts 40, 40' and 43 and their ends are bent back, said contacts being of resilient material, so that when said arm 39 is rocked by the spring 293, said ends will be pressed into engagement therewith. When the arm 39 is rocked in the opposite direction by the energization of the magnets 287, the brass tube 57 will be drawn out of engagement with the contacts 56, 56' and the carbon roller 42 will be drawn into engagement first with the contacts 40, 40' and then with the shorter contact 43.

Referring more particularly to Figs. 26, 27 and 28, the construction and operation of the indicating unit represented in Fig. 1 at I, and the shutter O for closing and disclosing the reading of said indicator will be described in detail. The indicating unit comprises one or more indicating wheels or counters 305 (see Fig. 26) arranged in train for expressing in figures of any desired number of places the weight of the load on the scale in any suitable units as pounds or fractions thereof. Herein a counter is provided for reading up to 2,000 pounds and is provided with an indicator, herein indicating wheels displaying the units, tens, hundreds and thousands digits, each figure of the number, however, being subject to change by increment or decrement through the actuation of one of the indicating units or wheels. This may be accomplished by various devices, but herein each unit is provided with an indicator wheel adapted to be moved in either direction by one or another of two sets of step-by-step actuating devices, referred to conventionally in the diagram (Fig. 1) as $I^{up}$, $I^{dn}$. Herein these actuating devices comprise step-by-step or incremental motors which may be similar to those described for advancing the poise B along the beam and therefore need no further description. These motors transmit their incremental movements to said indicator I by pawl and ratchet mechanisms which also may be similar to those described for transmitting the drive from the beam motors to the poise screw shaft 194 and therefore need no further description.

While but one indicator is shown herein it will be apparent that as many indicators may be used as desired and at a point or points more or less remote from the scale, it being merely necessary to connect such indicators in the circuits for the indicators shown as by the spur wires $x$, $x'$ (Fig. 1) connected to the wires of the indicator motor magnets.

Referring now more in detail to the shutter represented conventionally at O in Fig. 1, and to the mechanical construction of the operating mechanism therefor, this shutter comprises a plate 307 curved to conform to the contour of the counter-wheels and is apertured as at 307ª to disclose the numbers or characters on said counter-wheels. The indicator is positioned adjacent a window 308 (Fig. 3) in the casing 1 and the shutter may be turned to bring the apertures 307ª of said shutter in registration with said window to permit the reading of the indicator or said plate may be turned to conceal said indicator. To permit the shutter to rock, for this purpose, said shutter plate 307 is mounted on disk-like wheels 317, one at each end of said counter, said wheels being rotatively mounted on bosses 319 in uprights 319ˢ which may be secured within the casing 1, said bosses also constituting bearings for the shaft 321 carrying the indicator wheels. To rock said shutter as described the latter is connected to one end of a link 323 the opposite end of which is connected to one arm of a lever 325 secured to an armature shaft 326 said shaft being also secured to an armature 327 which is adapted to be rocked on the energization of the magnets of the shutter motor, represented conventionally in Fig. 1 at $S^m$, to open the shutter as described. The shutter is normally maintained in closed position when the shutter motor magnets are deënergized by a spring 329 which is adapted to draw said armature against an adjustable stop 330.

As previously stated, the rocking of the armature 327 of the shutter motor $S^m$ also operates the switch arm 15 (Fig. 1) which carries the bridge contact 14. Herein, this bridge contact (Figs. 26 and 27) is mounted on a disk 331 rotatively mounted on a stud 333 secured on the end of said plate. The fixed contacts 13, 13' (Fig. 1) are mounted on an opposed, but stationary disk 335 on said stud and secured to said plate. The rotative disk 331 is slotted at its edge to receive a pin 337 on the end of the lever 15. As a result when the shutter magnet is energized the bridge contact 14 will be drawn from engagement with the fixed contacts 13, 13' breaking the starting circuit to the transmitter as fully hereinbefore described. At the same time the armature 327 will rock the shutter cover plate 307, permitting the indicator reading to be seen through the casing window 308 (Fig. 3).

Where a perfectly balanced scale beam is used the rise of the beam at the balance point is not a certain and continuous movement, but due to the delicacy of the balance said beam is apt to oscillate up and down a number of times before the beam assumes a position of rest. One of the features of the invention contemplates the provision of means for overcoming these false balances and insuring the continuance of the rise of the beam and the breaking of the circuit at the contacts 50, 51, without any false vibrations or oscillations, such as referred to above. To this end the beam may have a governing or influencing extension of material preferably, although not necessarily, exactly above its fulcrum said extension herein comprising a weight 338 (Figs. 4 and 5) mounted on upright posts 338ª on said beam, herein fixed on the top of the boss 155ª carrying the knife edged fulcrum trunnion 155 of the beam. When the beam is in a mid or horizontal position the weight 338 may be on a dead center directly above the knife edge of the fulcrum 155, but when said beam tilts in one direction or another the weight will swing radially about the fulcrum 155 and tend to add to or accelerate the movement of the beam and will cause said beam to continue in the direction in which it starts to tilt without false vibrations.

The effect of this beam governing or tilting weight is to make the beam heavy or light according to whether the beam is tilted up or down. Herein said weight is sufficiently heavy to cause the beam to be in effect eight pounds light when the beam governing weight is rocked to the left or back of its mid position, and to be eight pounds heavy when said weight is rocked to the right or forward of its mid position. As the beam tilts up the controlling weight will be rocked to the left and the farther it rocks toward its mid position the less effective it will be in its tendency to oppose the rise of the beam. After the controlling weight passes its mid position said weight instead of opposing the rise of the beam adds to the rising of the beam and with a force which gradually increases according to the distance that said weight is rocked away from its mid position. It will be apparent that if the beam commences a tilting movement this movement will be assisted by said controlling weight and there will be no tendency for the beam to waver or oscillate but, on the contrary, the beam when it once commences a tilting movement will continue to complete that tilting movement without any hesitating or backward movement. As a result when the beam contacts 50, 51, referred to, are once separated to break the beam motor circuit and arrest the poise, there will be no liability of said contacts connecting again for that weighing operation to disturb the correct position of the poise.

When the beam commences to tilt up to separate the contacts 50, 51, (Fig. 13) the contact 50 preferably should not immediately emerge from the mercury contact 51, but said poise should travel a number of beats while the beam is rising in order to pull said contact 50 out of the mercury contact 51. As a result the beam will be well started in its upward movement before the contacts 50, 51, are separated to arrest the poise, said contacts being separated by a positive certain movement of the beam. This separation preferably will occur when the beam is in a horizontal or balanced position, thereby insuring the obtaining of correct weights.

From the above description and operation of the beam controlling weight, it will be apparent that when the beam is tilted down and said weight is rocked to the right it will be necessary for the poise to travel in a certain distance beyond the true balance point of the beam before said weight will have moved to a mid position and the opposition offered by it will be overcome so that when the beam tilts up and breaks the contacts and the poise comes to a rest the latter will have traveled in a certain distance beyond the balance point, but if the controlling weight and other conditions be constant the poise will always travel a uniform distance beyond the balance point before it is arrested. Herein the weight of said controlling weight and the conditions are such that the poise travels eight beats beyond the balance point in overcoming the effect of said weight before said poise is brought to a position of rest. The correct weight, of course, is obtained when the beam is in a position of true balance. It is, therefore, only necessary to adjust the indicator to correct for the uniform over-travel of the poise beyond the balance point in order to indicate correct weights thereat. It may be supposed, for example, that the poise first is caused to travel outwardly beyond the balance point and then returns toward the balance point and with no load on the scale the poise would travel herein eight beats beyond the balance point before the poise comes to a position of rest. The true reading of the weight, therefore, corresponds to a position of the poise eight beats back of its point of rest. It is, therefore, merely necessary to adjust the indicator so that when the poise is stopped the indicator will lag eight points back of said poise to read a weight corresponding to the position of the poise when it was at the balance point of the beam. The indicator might be adjusted to obtain this correction with no load on the scale, or a standard weight such, for example, as 25 pounds, might be placed on the scale platform and a cycle of operations initiated and after the poise had reached a position of rest the indicator could be adjusted independently to read 25 pounds. The indicator when thus set to accurately indicate the weight for 25 pounds would, of course, indicate the correct weights of loads the weights of which are unknown. Thus it will be seen that the reading is taken entirely from the indicator without the necessity of reading or observing any movements of the beam, the latter in effect, being merely a controlling lever for the indicator, a tilting movement of said beam causing the arrest of the indicator at a time to show the correct weight.

The weight 338 has a further function which we will now describe. Said weight preferably is not integral with its supporting posts 338ᵃ, but is separate therefrom (Fig. 4) and is secured thereto by clamping screws 338ᶜ passed loosely through elongated slots 338ᵈ in said weight and threaded into the tops of the posts 338ᵃ. The weight may be adjusted longitudinally of said beam and to one side of its dead center position by opposed adjusting screws 338ʰ adapted to engage the opposite sides of said clamping screws 338ᶜ. In weighing to the nearest pound, the next to the last step of the poise before arrest (the poise being fed inwardly) might occur at a position one-quarter pound from the proper position of tilt of the beam for correct weighing. The next and final step would carry the poise three-quarters of a pound beyond the position of correct beam tilt. The reading at one-quarter pound from the correct beam position would, therefore, be more accurate than the reading at three-quarters pound from the correct beam position. To cause the poise to stop at the one-quarter pound position instead of the three-quarters pound position the controlling weight may be adjusted slightly to the left so that if, for example, the reading of the next to the last step is 51 and the true weight is 50¾ pounds, the poise may be arrested to read 51 instead of 50 and will, therefore, be one-half pound nearer the true weight than if it stopped at 50. This adjustment of the weight to one side of its dead center will not interfere with its effectiveness in preventing false vibrations as described.

It will be apparent that the rocking effect of the weight on the beam may be varied if desired by vertically adjusting said weight on its supporting posts as by the interposition of washers 338ʷ therebetween.

It will be apparent that the weight 338 will cause the beam to rock with greater force than the usual beam and therefore to prevent said beam from pounding against or rebounding from its stops or limits 104ᵉ (Figs. 5 and 13) and to effect uniform movements of said beam a beam retarding device may be provided. This retarding device comprises an arm 341 (see Fig. 5) projecting beyond the end of the beam said arm being apertured to receive a needle 343 constituting herein the beam contact 50 referred to (Fig. 1). Said finger depends from said arm and is adjustably secured thereto by suitable nuts 345 threaded on to said finger at opposite sides of said arm. This contact needle may be insulated from said arm by an insulation washer 347 and a flanged insulation bushing 349. The lower end portion of this needle is adapted to be immersed in a mercury cup 351 (Fig. 13) herein constituting the beam contact 51 (Fig. 1). This cup may be carried by and project beneath a bracket 353 which may be adjustably secured to the upright 104 referred to by suitable bolts 354. One or more disks or paddles 355 (Fig. 13) may be secured to said contact needle, said paddles being immersed in oil or other non-conducting and retarding fluid in a dash-pot or cistern 357 also mounted on said bracket 353 and in communication with the mercury cup 351 referred to. The oil by virtue of its lighter specific gravity will float on the mercury in the cup beneath said dash-pot. The disks or paddles 355 preferably should not be of sufficient area to contact with the walls of said dash-pot, but should be spaced therefrom sufficiently to permit the retarding fluid to pass freely around said paddles. The dash-pot 357 may be provided with a suitable cap 359 centrally apertured to receive the needle 343. Since the pressure of a fluid in a vessel or cistern such as described, is uniform in all directions it will follow that the resistance to the movement of the needle paddles will be always uniform irrespective of the depth of their immersion. When the poise has traveled inwardly on the beam sufficiently to cause the beam to tend to rise the upward movement of the beam will be resisted by the retarding device until the force tending to move said beam upward is sufficient to insure the continuance of said movement without return of the needle to the mercury contact. It is important that when the needle 343 has once moved out of the mercury that it should not return thereto. Without a retarding device any jar of the floor, such as might be occasioned by a passing vehicle, might cause the scale beam to vibrate more or less and the contact needle 343 to vibrate up and down and prevent accurate balance of the beam.

Referring now to Figs. 29, 30 and 31, we will describe more in detail the mechanical construction of the timing device shown conventionally in Fig. 1 at T. This timing device comprises magnets 361 projecting laterally from an upright plate 363 having a bent continuation 365 constituting a base for supporting the same. The poles of the magnets 361 support a plate 367 and in this plate and said yoke 363 and between said magnets is journaled an armature shaft 369. A rocking armature 370 is secured to said armature shaft and is normally rocked away from the field of said magnets by a spring 371, the movement of said armature being limited by an adjustable stop 373 (Fig. 30). This armature is adapted to be rocked toward said magnets under the intermittent energization of the latter as occasioned by the transmitter motors previously described. When the armature is rocked toward its magnets under the energization of the latter the spring 371 is tensioned. When the magnets are subsequently deënergized the spring does not rock the armature sharply away from said magnets, but the retreat of the armature may be retarded, as previously stated, for a predetermined period, such as three seconds, in order to delay the engagement of the bridge contact 11 (Fig. 1) with the fixed contacts 10, 10' of the shutter motor circuit to unlock the operating handle, lock the beam, open the shutter, light the lamp and ring the bell.

The delayed closing of the bridge contact 11 is effected herein by the resistance offered by the air to the rotation of a fan 375 which is driven by the spring 371 by a gear train comprising a ratchet 377 secured to the armature shaft 369, and engaging a pawl 379 mounted on the face of a large gear 381 loose on said armature shaft. This gear 381 meshes with a pinion 383 on a stud shaft 385 secured to the plate 363, said pinion being secured to a large gear 387 which meshes with a pinion 389 loose on the armature shaft, the fan 375 being secured to said pinion. Thus it will be apparent that as the armature shaft tends to rock under the action of said spring, the fan through the gear train described will be rapidly rotated and will cause the slow rocking of the armature shaft permitting the desired interval of time to elapse before the bridge contact 11 engages with the contacts 10, 10' and thereby completes the circuit to the shutter motor as described. When the armature is rocked toward the poles of the magnets 361 by the energization of the latter the ratchet 377 will be free to slide past the pawl 379 without hindrance.

It will be remembered that the time switch motor is utilized not only to connect or disconnect the bridge contact 11 with the contacts 10, 10' of the shutter motor circuit, but also to operate the bridge contact 61 (Fig. 1) which controls the circuit to the magnet of the release motor M$^r$ (Fig. 1). Referring to Fig. 30 the same bridge contact 11—61 is used, first for connecting the release circuit contacts 60, 60' and subsequently connecting the shutter motor circuit contacts, 10, 10'. To this end said bridge contact 11—61 is mounted on a disk 391 of insulating material said disk being rotatively mounted on a stud 392 secured to the plate 367 of the upper magnet 361. Opposed to said rotary disk is a fixed disk 393 of insulation material carrying the fixed contacts 10, 10' and 60, 60'. The rotary disk 391 is rotated from the armature shaft 369 by a lever 397 secured to said armature shaft 369 and having a pin 370 received by a slot 370$^a$ in the edge of said disk 391.

During the beating action occasioned by the out and in transmitter motors the time switch armature 369 beats back and forth but without rocking sufficiently to connect the bridge contact 11 with the fixed contacts 10, 10' as long as the in-motor continues to operate. As soon as the poise rest point is reached the time switch stops beating and the switch arm rocks slowly back and at the limit of its stroke connects the bridge contact 11 with the fixed contacts 10, 10' thereby closing the shutter motor circuit.

Referring now more particularly to Figs. 32, 33 and 34 we will now describe the mechanism W whereby the weight shown at the indicator is printed or recorded. This mechanism comprises a series of wheels or disks 399 (Fig. 34) containing type numbers or digits corresponding to those on the counter at the indicator, referred to diagrammatically in Fig. 1 at I. These wheels are rotated by and in unison with the wheels of the indicator I by a flexible shaft 401 (Figs. 32 and 34) one end of which is connected at one end to the shaft 319 (Fig. 26) carrying the counter wheels of the indicator, and at the opposite end by a coupling 403 (Fig. 34) to a shaft 405 carrying the number wheels 399 referred to. This shaft is journaled in a frame 407 bolted to an upright plate 409 mounted on a base 411 (see Figs. 3 and 33). Coöperating with the type wheels 399 referred to is an inking ribbon 413 (Fig. 33) carried on rollers 415, one above and one beneath the type wheels 399, the inking ribbon being led from one to another and past said type wheels. Also mounted on said frame plate 409 are rollers 417 carrying a paper ribbon 418 for receiving the imprint from said type. This paper ribbon is guided over rollers 419 and 420 to cause said paper ribbon also to pass in front of the type wheels 399. The paper ribbon may be tensioned by a pressure roller 421 mounted in arms 423 fulcrumed on a stud 425 on said plate 409, said arms and roller 421 being rocked to cause the latter to press against the roller 420 by a spring 427. To connect the operating handle 5 (Fig. 3) with the printing mechanism there is provided an arm 125 (Fig. 20) secured on the handle shaft 4 and connected to one end of a connecting rod 431, the opposite end of the latter being connected to a crank 433 (Fig. 32) fast on a short shaft 435, said shaft being journaled in a bearing 437 (see Figs. 3 and 32) mounted on a bracket supported on the base 411. On the opposite end of this short shaft 437 is a bevel pinion 439 meshing with a similar pinion 441 fast on the end of a shaft 443 journaled in said plate 409 and a parallel plate 409$^a$. Loosely mounted on said shaft 443 is a star wheel 445 (see Fig. 35) adapted to be turned in one direction by a ratchet 445$^a$ fast on said shaft 443, said ratchet engaging a spring pressed pawl 445$^b$ mounted on the face of said star wheel. Adjacent the shaft 443 is a countershaft 449 carrying an arm 450 supporting a frame or rack 453 (Fig. 33) in which is mounted a series of spring pressed platen plungers 455 (see Fig. 34), a separate plunger being provided for each of the type wheels 399. To rock the rack 453 a crank 447 is secured to said countershaft 449 and is provided with a follower 451 pressed into engagement with said star wheel by a spring 457 secured at one end to said rack arm 450 and at its opposite end to a stud on the frame. When the operating handle 5 is rocked to the right the star wheel 445 will be rotated causing the follower to ride over one of the peripheral elevations of the star wheel, thereby rocking the platen plungers 455 toward the type wheels 399 to effect the printing operation. When the handle is rocked in the opposite direction as for initiating a weighing operation the ratchet 445$^a$ will slide past the pawl 445$^b$ without turning the star wheel 445.

To feed the ink and paper rolls 415 and 417, gears 445$^1$ and 445$^p$ may be secured to said star wheel 445; one of said gears meshing with a gear 415$^a$ secured to said ink roll 415 and the other meshing with a gear 417$^a$ secured to said paper roll 417.

The weighing apparatus is provided with separate key control whereby the weighing cycle may be made by the weigher, or by the inspector or adjuster. To indicate by whom the weighing cycle is made, an additional type disk or wheel 457 (Figs. 1 and 34) is provided. This wheel is provided on its periphery with suitable characters to indicate the weigher or the adjuster. Herein the type W is used to represent the weigher, whereas the type A is used to represent the adjuster or inspector. This disk may be rotated to cause the letter W or the letter A to come opposite a platen plunger by a bell crank 457$^a$ fulcrumed on the plate 407, one arm of said bell crank being connected to said disk 457 by a spring 457$^s$ (Fig. 36). To insure the accurate positioning of the types W and A opposite their plunger, the rocking adjustment of said disk 457 may be limited by a stop 457$^p$ on said frame 407 and engaging one or another of the ends of a recess 407$^r$ in said disk 457. The other arm of said bell crank is connected to a spring pressed rod 458 which normally rocks the disk 457 to bring the weigher's letter W in position for printing. The adjuster's letter will take the place of the weigher's letter automatically and only when the adjuster is making a weighing cycle by the operation of the rod 408 as more fully hereinafter described.

As stated, it is necessary in scales of this character to provide for the frequent calibration of the scale owing, among other reasons, to the fact that the platform sometimes becomes wet, is cut by trucks or receives dirt or other foreign accumulations of one kind or another, which would tend to destroy the correctness of the weighing.

Referring now more particularly to Figs. 1, 15, 16 and 17, there will be described more in detail the controlling mechanism whereby the adjuster or inspector may calibrate the machine and operate the indicator motors without operating the beam motors. This mechanism is controlled by the adjuster's or inspector's key which may be inserted in the key hole 6$^a$ (Figs. 3 and 18). This key fits a lock of usual construction represented by general lines at 466 (Fig. 19). This lock is provided with a coupling 466$^a$ having a squared end projecting into a similarly shaped recess in the end of a short shaft 466$^b$, the latter being journaled in the uprights 4$^c$, 4$^a$ (Figs. 14 and 19) on the shelf 4$^d$ in the casing 1. Fast on said shaft 466$^b$ is a disk or member 465 (Fig. 15) which may be turned by the adjuster's key at the key hole 6$^a$ (Figs. 3 and 18), for purposes to be described. This disk 465 is positioned adjacent the operating handle 5, and to prevent the turning of said disk after the operating handle 5 is rocked for a normal weighing cycle, said disk is provided with a radial slot 467 adapted to receive a pin 471 on the lever 7 when the latter is rocked from the position shown in Fig. 15 to that shown in Fig. 16.

To insure the completion of a cycle of operations when once initiated, the disk 465 is prevented from turning in a contra-clockwise direction by the engagement of a dog 479 (Fig. 15) with a ratchet 485 fast on the disk shaft 466$^b$, said dog being mounted on a pin 481 secured to the frame plate 4$^c$ (see Fig. 14) and pressed into engagement with said ratchet by a spring 487 connected to a pin 489 on the frame plate 4$^c$ (Fig. 14). When the key is inserted in the key hole 6$^a$ it may thus be turned only in a clockwise direction causing the disk also to move in a clockwise direction and the ratchet to slide past the dog 479.

The disk is provided with a second radial slot 505, said slot being brought into a position opposite the pin 471 by turning the adjuster's key to the right. To stop said disk with its radial slot 505 opposite the lever pin 471 a pin 491 (Fig. 15) is provided, said pin projecting laterally from the face of the disk 465 and being adapted to engage a lug 493 (Figs. 14 and 15) projecting from the face of a stop lever 495, the latter having an elongated slot 503 supporting said lever 495 on the shaft 466$^b$, said stop lever being normally held against a stop 497 mounted on the plate 4$^c$ by a spring 498, but when the disk 465 is rotated in a clockwise direction the disk pin 491 engages the stop 493 on the lever 495, causing the latter to rock about the shaft 466$^b$ until said lever 495 engages a stop 498' on the frame plate 4$^c$. When the stop lever 495 reaches this position the radial slot 505 is in line with the pin 471 on the lever 7 and the latter may be rocked from the position shown in Fig. 15 to the position shown in Fig. 16 to cause said pin to enter said slot. This first rocking movement of the disk not only positions the radial slot 505 in line with the pin 471, but also rotates the wheel 457 (Figs. 1 and 34) of the printing mechanism to bring the adjuster's character A in position to print instead of the weigher's character W. This is effected herein by a cam 458$^a$ (Figs. 14 and 23) fixed on the disk shaft 466$^b$, said cam being adapted to engage a follower 458$^b$ mounted on a fork 458$^c$ which straddles the shaft 466$^b$ and is adjustably connected to the connecting rod 458 (Fig. 34) referred to by a set screw 458$^d$. When the disk 465 is rocked the cam 458$^a$ will be turned and will thrust the connecting rod 458 longitudinally against the resistance of its spring (Fig. 34) and rock the bell crank 457$^a$, the latter in turn rocking the wheel 457 herein to bring the letter A in position to print. When the disk 465 is in its normal position the cam 458$^a$ will be in the position shown in Fig. 23 and the spring on said rod 458 will rock the bell crank 457$^a$ to return the letter W in position to print.

When the lever 7 controlled by the operating handle has been rocked from the position shown in Fig. 15 to a position slightly beyond that shown in Fig. 16 a weighing cycle will commence.

To insure the initiation of a weighing operation before the disk 465 is turned any further, the operating lever 7 must be rocked from the position shown in Fig. 16 to its dotted position shown in Fig. 17, thereby making certain the closing of the bridge contacts 17, 45, 45$^i$ and 38$^2$ (Fig. 1), said operation starting a weighing operation which will be automatically completed as previously described. When the operating lever 7 is moved into the dotted position shown in Fig. 17 its pin 471 will engage an end 501 of the stop lever 495 and will thrust the latter longitudinally, causing the stop 493 to move out beyond the disk pin 491, thereby permitting said stop lever 495 to be retracted by its spring 499 back against the fixed stop 497, as shown in Fig. 17. When the handle locking dog 84 (Fig. 21) is unlocked by the hook lever 86$^h$ at the completion of a weighing cycle, the handle lever 7 may be rocked to bring its pin 471 out of the disk slot 505, and the disk 465 being no longer held by the stop lever 495, may be turned by the adjuster's key to the right to bring the disk pin 491 into the position shown in Fig. 17. Further rotation of the disk 465 at this time is prevented by the engagement of said pin with upper and lower stop levers 507 (Figs. 15, 16 and 17) having normally abutting ends. These levers are fulcrumed on pins 509 on a T-shaped lever 511. To rock said levers toward the disk pin 491 their ends are bifurcated to form two arms 515 and 521, their arms 515 being normally drawn against stops 517 on said T lever by a spring 519, one end of which is connected to the arm 521 of the upper stop lever while its opposite end is connected to the arm 521 of the lower stop lever. When said levers are rocked against their stops 517 they will be at an angle one to another, and will leave a V-shaped space between their abutting ends. When the disk pin 491 is turned from its position shown in Fig. 16 to that shown in Fig. 17, said pin will slide along the side of the upper stop lever 507, rocking the latter somewhat until said pin passes beyond the end of said lever, whereupon the latter will spring back to its normal position and the pin 491 will be entrapped between the ends of said upper and lower stop levers 507. To permit said pin 491 to come between the ends of the stop levers 507, one of the latter, herein the lower lever, may be provided with an elongated slot 525 permitting the disk pin 491 to thrust said lower lever 507 longitudinally against the resistance of its spring 519, thereby separating the normally abutting ends of said levers somewhat.

The T-lever 511 referred to is adapted to be rocked by slight movements of the disk pin 491, to make and break the circuits to the indicator motors without affecting the beam motors, as hereinbefore described. To this end said T-lever 511 is pivoted on a stud 513 on the upright plate 4$^c$ (Fig. 14), said T-lever being normally held in a mid-position by spring pressed centering plungers 527, engaging opposite sides of said T-lever and mounted in brackets 529 which are secured to the face of said upright plate 4$^c$.

The end of said T-lever carries the common contact 65 (Figs. 1 and 15) and the contacts 67, and 68 of the independent indicator circuits are mounted on blocks 535 of insulation material.

When the disk 465 is in the position shown in Fig. 17, with its pin 491 between the stop levers 507, the dog 479 which prevents contra-clockwise rotation of said disk 465 is on a toothless portion 485$^a$ of said ratchet 485, thereby permitting slight rocking movements of the disk 465 as by turning the adjuster's key back and forth somewhat. This slight rocking of the disk will be sufficient to cause the pin 491 to rock the T-lever 511, thereby connecting the contact 65 with one or the other contacts 67 and 68 as desired. By the arrangement of circuits described the connection of the common contact 65 with the upper contact 67 will start the beating of the in-transmitter and down indicator, whereas the connection of said common contact with the lower contact 68 will start the beating of the out transmitter and up indicator. The beam motors and poise will remain stationary during this operation.

By this arrangement the indicator may be adjusted independently of the poise and the indicator may be adjusted to read zero when the poise is in a position of balance or otherwise as desired.

After the indicator has been given this independent adjustment before the adjuster's key can be withdrawn the disk 465 must be turned on to the right, to bring the same to its original position. When the disk 465 was turned to bring its pin into the position shown in Fig. 17 a third radial slot 491$^s$ was brought into a position adjacent the pin 471 of the handle operated lever 7. The disk 465 having been turned to rock the common contact into its mid-position and out of engagement with either of the contacts 67 and 68, the slot 491$^s$ by this movement is brought opposite to the pin 471. To untrap or release the pin 491 and permit the continued turning of the disk 465, the handle operated lever 7 is provided with an extended end carrying a pin 537. The operating handle 5 is now rocked to the left, causing the lever pin 471 to enter the disk slot 491$^s$.

The continued rocking of said lever will cause the pin 471 to enter farther into the radial slot 491$^s$, and the pin 537 at the end thereof will engage the side of the lower stop lever 507 and rock the latter out from beneath the pin 491, whereupon the spring 519 will slide said lever longitudinally alongside of said pin into the dotted position shown in Fig. 17.

It should be stated that the stop lever 507 is not tripped by the lever 7 until the latter has rocked sufficiently to close the starting circuits for initiating a new weighing cycle.

The handle 5 is then rocked to the right, to print the reading of the indicator and at the same time the pin 471 is rocked out of the disk slot 491$^s$, thereby permitting the disk 465 to be turned on to its original position, bringing the disk slot 467 opposite the pin 471 and permitting the adjuster's key to be removed from the key hole 6$^a$. The adjuster's cycle of operations is then complete.

By the adjuster's controlling mechanism as hereinbefore described, it will be observed that when the adjuster introduces his key into the key hole 6$^a$ and turns the disk 465 to initiate a weighing operation the weight is indicated and recorded; the disk must be turned on into a position to permit the independent adjustment of the indicator; and a second weighing operation must be initiated, completed and recorded before he can withdraw his key.

By the indicator control described the adjustment of the indicator may be quickly and readily made from the exterior of the casing containing the weighing mechanism and without the necessity of any adjustment of the beam. The great value of this ready adjustment will be apparent when it is understood that the extensive and continuous operation of scales in certain uses renders it necessary to calibrate the scale several times each day.

Sometimes a truck or other load conveyance is placed on the platform of the scale and the indicator is adjusted to read net weights exclusive of said truck or conveyance. For example, if the truck weighs 200 pounds the indicator will be adjusted to read zero with the truck on the scale. If the truck is removed from the scale and a weighing operation started the indicator will run back from zero reading to 800 pounds. In order that the printing mechanism may not record such an operation as a regular weighing operation, a letter "T" is substituted for "9" on the fourth type wheel (Fig. 37). It will be apparent if the weigher now starts a weighing operation without the truck on the scale the type wheels instead of adding will move backward and the first decrement of movement will bring the number 9 on the units, tens and hundreds type wheels in position to print and the letter "T" on the fourth wheel in position to print, the letter "T" remaining in position to print for subsequent decrements of movement of said wheels, and thereby showing that the above was not a regular weighing operation.

The operation of the apparatus is as follows:

Referring more particularly to Fig. 1, a load having been placed on the scale platform, the weigher's key is inserted in the key hole 6$^w$ and turned to the left, rocking the bridge contact 12 and closing the electric circuit which energizes the magnets of the shutter motor, said circuit passing first through the shutter cutout or starting switch C and the switch 11 at the time mechanism. The closing of this circuit also lights the shutter light Q and rings the bell V, the latter announcing that a weighing operation is about to commence. The closing of said circuit also energizes the unlocking motor, but to no purpose at this time. The closing of said circuit also supplies current to the releasing motor M$^r$, but said motor is ineffective since its negative circuit is broken by the switch 61 at the time motor T. The energization of the shutter magnets rocks the shutter armature and opens the shutter O and discloses the reading of the weight indicator I. The operating handle 5 is then rocked to the left, this movement being permitted by the position of the slot 6$^s$ of the disk 6$^e$ opposite the lever pin 7$^a$, said disk having been turned to this position simultaneously with the rocking of the bridge contact 12. When the handle is rocked into this position, the handle locking dog 84 rocks from the position shown in Fig. 20 to that shown in Fig. 21 and drops into the notched end 85$^a$ of the short locking arm 85 on said handle shaft 4 and prevents the removal of the lever pin 7$^a$ from the disk slot 6$^s$. It will be apparent that the disk 6$^e$ cannot be turned back into its original position to permit the removal of the key until the rocking lever 7 has rocked its pin 7$^a$ from the radial slot in said disk. The rocking of the handle to the left as described closes the contacts 17, 45, 45$^1$, and 38$^2$, closing the starting circuit for the out transmitter and the circuits to the beam motors.

Said movement of the operating handle also opens the starting switch C by the rocking of the disk 87 by the dog 84 through the trigger 88, and breaks the circuit to the shutter motor, the lamp, bell and the unlocking motor M$^u$. As a result, the shutter is closed, the lamp goes out, and the bell stops ringing. When the shutter armature 327 (Fig. 27) rocks to close its shutter switch the arm 325 turns with it and closes the contact 14 in the starting circuit for the out transmitter, said circuit passing first through contacts 16 16′ which are now bridged at the operating handle by the bridge contact 17. Said circuit passes from the contact 14 through normally closed contacts 18 18′ at the up-indicator motor and through normally closed contacts 20, 20′ at the down-indicator motor, thence through normally closed contacts 22, 22′ at the out-beam motor and normally closed contacts 24, 24′ at the in-beam motor, through normally closed contacts 26, 26′ at the reverse motor, on through normally closed contacts 28, 28′ at the in-transmitter motor, and thence to the magnets of said out-transmitter T$^o$. The energization of the out-transmitter magnets rocks its armature 291 (Fig. 24) and closes the contact 42 closing the circuit to the magnets of the out-beam motor M$^o$ and the magnets of the up-indicator motor I$^{up}$. This is effected by connecting the operating wires $o$, $o′$ to the wire $o^2$ which branches, one branch $o^3$ leading to the magnet of the up-indicator motor I$^{up}$, while the other branch $o^4$ leads through contacts 44, 45′ at the operating handle and wires $o^5$, $o^6$ to the magnets of the out-beam motor M$^o$. By this arrangement of circuits the up-indicator motor and the out-beam motor are connected in parallel with the operating wire $o$, this parallel connection effecting the synchronous energization of the magnets of both said indicator motor and beam motor. The wire $o^5$ has a branch $o^7$ which supplies current to the time switch magnet causing a synchronous beating action of the time armature 370 (Fig. 30).

The energization of the magnets of the out-beam motor and up-indicator motor first causes the breaking of the out-transmitter starting circuit at the contacts 23 and 19, and then the breaking of the negative circuit of the out-transmitter at the contacts 37 and 33. The first operation deënergizes the starting coil of the out-transmitter, and the second operation deënergizes the holding coil of the out-transmitter. The latter operation will permit the spring 293 (Fig. 24) to rock the armature 291 and at the contact 42 break the operating circuit for the magnets of the out-beam motor and up-indicator motor.

The deënergization of the magnets of the out-beam motor and up-indicator motor will permit the springs of their armatures to close first the contacts 37 and 33 thereby closing the negative circuit of the out-transmitter, and then the contacts 23, 19. As a result, the starting circuit for the out-transmitter will not be closed until the armatures of both the out-beam and up-indicator motors have, under the action of their springs, retracted their pawls completely so that before the magnets of said motors are again energized said pawls will each have dropped behind teeth in a position to advance the same, thereby insuring the synchronous action of said pawls and as a result a step of feed at the indicator for every step of the poise. Also, at the completion of the magnet strokes of said motors the contacts 37 and 33 are not opened until both the poise and the indicator have each made a complete step.

The alternate energization of the magnets of the out-transmitter and of the out-beam and up-indicator motors effects the step-by-step or beating-up action of the poise and indicator, and insures a reading of the indicator corresponding to the reading of the poise, as hereinbefore described.

This beating-up action causes the poise to move outwardly on the beam B until said poise passes beyond the balance point, whereupon the beam will drop, connecting the beam contacts 50 and 51, thereby connecting the wire $t^6$ with the wire $s′$ leading to the magnets of the reversing motor R, thereby energizing said magnets and breaking the out-transmitter starting circuit at the contact 27 and closing the bridge contact 59, thereby energizing the holding coil of said reverse motor and also closing the in-transmitter circuit at the bridge contact 54, whereupon said in-beam motor and down-indicator motor will be operated in a manner exactly similar to that described for the out-transmitter, out-beam motor and up-indicator motor.

The in-beam motor will cause the poise P to travel inwardly to the balance point and beyond the balance point a sufficient distance to counteract the opposition offered by the controlling weight 338 causing the beam to rise with a positive certain movement, thereby separating the beam contacts 50 and 51, breaking the circuit to the in-transmitter, in-beam motor, down-indicator motor and arresting the poise and indicator. The poise will have stopped beyond the balance point in overcoming the opposition of the controlling weight 338, but the indicator will read a weight corresponding to the balance position of the beam, said indicator having been previously adjusted to correct for the overtravel of the poise.

By the wiring shown herein one of the coils of the magnet of the time switch motor T is energized on the starting of the out-transmitter and another coil is energized during the operation of the in-transmitter. It will be understood, however, that it is only necessary to energize the time switch motor when the poise is moved toward its position of rest. As shown herein the poise approaches said position under the action of the in-motor. The armature 370 (Fig. 30) of said time switch motor will be intermittently rocked under the periodic energization of its magnet, as described. The first rocking movement of said armature will momentarily close the contact 61, completing the circuit to the release motor M$^r$ (Fig. 21), thereby rocking its armature 91 and with the latter the trip arm 92, tripping the trigger 88 and permitting the disk 87 carrying the bridge contact 9 to rock under the action of its spring 87$^a$ and connect the contacts 8, 8′ of the shutter motor circuit. The beating up movements or pulsations of the time armature during the normal travel of the poise are of such frequency that said armature is not given opportunity to be rocked by its spring sufficiently to close the switch 11 for closing the shutter circuit, but when the in-motor is stopped by separating the contacts 50 and 51 the switch 11 closes the circuit to the shutter motor, thereby opening the switch 14 at the shutter motor which breaks the starting circuit to the out-transmitter. At the same time the shutter motor S$^m$ will open the shutter O, the lamp Q will light, and the bell V will sound. The closing of the shutter circuit also closes the circuit to the unlocking motor M$^u$ which pulls the hook lever 86$^h$ (Fig. 21) and rocks the handle locking dog 84 to the right, permitting the handle to be rocked to the right and print the weight registered on the indicator.

The energization of the unlocking motor M$^u$ also locks the beam lock L, the rocking of the armature 86$^c$ (Fig. 21) of said unlocking motor also rocking the arm 133 which trips the pin 142 and permits the short arm 115 to be rocked by its spring 117, causing the beam locking fingers 103 (Fig. 12) to lock the beam. The weigher's key may be then turned in a clockwise direction to its normal position, breaking all of the circuits at the switch 12 and permitting said key to be withdrawn. This completes a normal weighing cycle or operation.

The adjuster's operations for calibrating the scale will now be described. First the shutter motor circuit is closed at the contact 12 by turning the weigher's key in the key hole 6$^w$. The adjuster's disk 465 is then turned by the adjuster's key to bring the disk slot 505 in line with the pin 471 on the handle operated lever 7. This initial turning of the disk 465 causes the cam 458$^a$ (Fig. 23) on the disk shaft 466$^b$ to rock the bell crank lever 457$^a$ (Fig. 34) of the printing mechanism to bring the adjuster's letter "A" into printing position, said character indicating that the weighing operation is made by the adjuster and not by the weigher. The operating handle is then rocked to the left to initiate a weighing operation, at the same time tripping the stop lever 495 and permitting the disk pin 491 to be turned, after the handle has been rocked to the right, to bring the third disk slot 491$^s$ opposite the pin 471 on the lever 7 and bring the disk pin 491 into a position to be entrapped between the opposed ends of the stop levers 507. This rotates the disk ratchet 485 into a position to bring its toothless portion 485$^a$ opposite the ratchet dog 479, thereby permitting the disk at this portion to be oscillated to a slight extent to rock the T-lever 511 for causing the common contact 65 on said lever to engage one or another of the contacts 67 and 68, thereby connecting the positive main by the wire $i$ with either of the wires $i'$, $i^2$ of the in-transmitter and out-transmitter circuits, respectively, to operate the indicator down or up. The beam motors will not be operated since the circuits thereto are open at the handle operated switch. One or the other of the indicator motors is thus started and may be operated to bring the indicator into a zero or other position to accurately represent the proper reading relative to the position of the poise on the beam. The disk 465 is then turned by its key to bring the T contact 65 into a mid-position, in which it is connected to neither of the contacts 67 or 68 and the indicator motors are stopped.

To permit the disk 465 to be turned on and to its original position, the operating handle is rocked to the left causing the end pin 537 of the lever 7 to rock the lower stop lever 507 from beneath the disk pin 491 and at the same time initiate a second weighing cycle. After the operating handle 5 is rocked to the right to print the reading of this cycle the disk 465 may be turned to its original position and the adjuster's key removed from the key hole 6$^a$.

It will be understood that the invention is not limited to the embodiment shown herein, but that various modifications may be made therein without departing from the spirit and scope of the invention.

Claims:

1. A machine of the class described comprising in combination, a beam, a poise thereon, a weight indicator, actuating means for said poise and indicator, recording means, key controlled starting means for said actuating means, locking means for said starting means and means including electric connections whereby said key may not be removed before the beam has tilted and the weight has been recorded.

2. A machine of the class described, comprising, in combination, a scale beam; a poise; actuating means for advancing the latter along said beam; controlling means for said actuating means including an electric circuit therefor; a switch in said circuit; a handle for operating said switch; means movable to a position to permit rotation of said handle in one direction for initiating a weighing operation; and automatically operated means for preventing rotation of said handle in an opposite direction prior to the completion of the weighing operation of the beam; and means for automatically unlocking said handle after the beam has finally tilted.

3. A machine of the class described comprising in combination, a scale beam; a poise; actuating means for advancing the latter along said beam; controlling means for said actuating means comprising a handle adapted to be rocked in one direction for initiating a weighing operation, a spring pressed latch for preventing return movement of said handle prior to the completion of the beam weighing operation, and means for automatically unlocking said latch after the completion of said operation.

4. A machine of the class described comprising in combination, a scale beam; a poise; actuating means for advancing the same along said beam; controlling means for said actuating means comprising an electric circuit for energizing said actuating means; and a manually operated switch for closing said circuit; locking means for preventing the opening of said switch after a weighing operation has been initiated and prior to the final tilt of the beam; and an unlocking motor having provision for automatically energizing the same after said tilt.

5. A machine of the class described comprising, in combination, a scale beam; a poise; actuating means for advancing the latter along said beam; starting means for said actuating means comprising a manually rocked shaft; an electric circuit; a switch controlled by said shaft for closing said electric circuit to energize said actuating means; a spring pressed dog for preventing movement of said shaft after the weighing operation has been initiated; and automatic means for tripping said dog after the beam has finally tilted.

6. A machine of the class described, comprising, in combination, a scale beam; a poise; actuating means for advancing the latter along said beam; starting means for said actuating means comprising a manually rocked shaft; an electric circuit; a switch controlled by said shaft for closing said electric circuit to energize said actuating means; a spring pressed dog for preventing movement of said shaft after the weighing operation has been initiated; and means for automatically tripping said dog after said beam has finally tilted comprising an unlocking motor; an armature therefor; and a trip lever connected to said armature.

7. A machine of the class described comprising, in combination, a scale beam; a poise; actuating means for moving the latter along said beam; controlling means for said actuating means comprising a manually operated switch; an electric circuit opened and closed by said switch for energizing said actuating means; a lock for said controlling means; means controlled by said lock for preventing movement of said switch prior to the locking of said lock; means for automatically locking said switch after the latter has been closed to initiate a weighing operation; and means automatically to unlock said switch after the beam has finally tilted.

8. A machine of the class described comprising, in combination, a scale beam; a poise; actuating means for moving the latter along said beam; starting means for said actuating means comprising a manually controlled switch; a circuit controlled by the latter for energizing said actuating means; a weigher's lock; means controlled thereby for preventing the closing of said switch prior to the locking of said lock; and means for preventing the unlocking of said lock prior to the completion of a weighing operation.

9. A machine of the class described comprising, in combination, weighing mechanism including a weighing beam, a poise and actuating means for advancing the latter along said beam; indicating means coöperating with a portion of the weighing mechanism for registering the record of the weight made at each weighing operation; printing means for recording the weight; and means providing for the making of distinctive marks accordingly as the weighing operation is of one character or another.

10. A machine of the class described comprising, in combination, a weighing beam; a poise; actuating means for advancing the latter along said beam; a weight-registering indicator; actuating means therefor; and a motor transmitting unit for controlling the operation of said poise and indicator actuating means.

11. A machine of the class described comprising, in combination, a weighing beam; a poise; an electric motor for advancing the latter along said beam; an indicator; an electric motor therefor; a motor transmitting unit for controlling said poise and indicator motors; and a circuit connecting said motors in multiple with said transmitting unit.

12. A machine of the class described comprising, in combination, a weighing beam; a poise; a motor for advancing the latter along said beam; an indicator; a motor therefor; and a motor transmitter for operating said motors synchronously.

13. A machine of the class described comprising, in combination, a weighing beam; a poise; a motor for advancing the latter along said beam; a weight indicator; a motor therefor; a transmitter motor; a circuit for energizing the magnet of the latter; contacts at said transmitter motor; a circuit connected to one of said contacts; a circuit connecting said other contacts in multiple with the magnets of said beam and indicator motors; a bridge contact operated by the energization of the magnets of said transmitter motor, thereby energizing the magnets of said poise and indicator motors; contacts at said poise and indicator motors connected to circuits of said transmitter motor, and bridge contacts for opening said circuits to deënergize the magnet of said transmitter.

14. A machine of the class described comprising, in combination, a weighing beam, a poise, a motor for moving the latter along said beam; a weight indicator; a motor therefor; a transmitter; a starting circuit therefor; a switch operated by said transmitter; an operating circuit for locking said switch; a circuit connecting the latter in multiple with the magnets of said poise and indicator motors; and switches in said starting and operating circuits and operated by said motors whereby the magnets of said poise and indicator motors will be synchronously energized or deënergized.

15. A machine of the class described comprising, in combination, a weighing beam; a poise; a motor for moving the latter in one direction; a motor for moving said poise in the opposite direction; and electrical means for controlling said motors including a contact on said beam; a contact adjacent said beam, electric circuits for said motors, a reverse switch for making and breaking the circuits to said motors, a circuit connected to one of said beam contacts and a circuit connecting said other beam contact with said reverse switch, whereby on a movement of said beam said contacts will connect and complete the circuit to said reverse switch.

16. A machine of the class described comprising, in combination, a weighing beam; a poise; a motor for advancing the latter along said beam in one direction; a motor for advancing said poise in the opposite direction; means automatically to stop one of said motors and start the other; means automatically to stop the latter motor after the beam assumes a position of balance; and means coöperating with said beam for automatically locking said beam after the same assumes a position of balance.

17. A machine of the class described comprising, in combination, a weighing beam; a poise; actuating means for advancing the latter along said beam; and means automatically controlled by said beam to lock the same after it has reached a position of balance.

18. A machine of the class described comprising, in combination, a weighing beam; a poise; actuating means for advancing the latter along said beam and means for automatically locking said beam when an interval of time has elapsed after said beam has reached a balance position.

19. A machine of the class described comprising, in combination, a weighing beam; a poise; actuating means for advancing the latter along said beam; means for locking said beam; means for operating said locking means after said beam rises to balance comprising a motor having a rocking armature, an arm movable with the latter and a trip operated by said arm for setting in operation said locking means; and electrical connections for automatically energizing said motor after said beam rises to balance.

20. A machine of the class described comprising, in combination, a weighing beam; a poise; actuating means for advancing the latter along said beam; and locking means for said beam comprising a pair of rocking fingers, a spring tending to press the latter into engagement with said beam, a trip mechanism for preventing the engagement of said fingers with said beam during the weighing operation, and electrically operated means for tripping said trip to permit said fingers to engage said beam after the beam rises to its balanced position.

21. A machine of the class described comprising, in combination, a weighing beam; a poise thereon; and locking means for said beam including stops on said beam for limiting the movement of said beam.

22. A machine of the class described comprising, in combination, a weighing beam; a poise thereon; and controlling means for said beam including an electric contact needle connected to said beam; retarding means secured to said needle; an oil well in which said means is submerged; and a mercury cup communicating with said oil well and adapted to receive the end of said needle.

23. A machine of the class described comprising, in combination, a weighing beam; a poise thereon; and controlling means for said beam including an electric contact finger depending from said beam; a mercury contact beneath said finger; and a beam retarding device combined with said contacts.

24. A machine of the class described comprising, in combination, a weighing beam; a poise thereon; a weight indicator; a shutter therefor; and automatic means to open said shutter at the initiation and completion of a weighing operation.

25. A machine of the class described comprising, in combination, a weighing beam; a poise thereon; a weight indicator; a normally closed shutter for the latter; and automatic means for opening said shutter after the completion of a weighing operation.

26. A machine of the class described comprising, in combination, a weighing beam; a poise thereon; an indicator; means for actuating the latter to indicate weights corresponding to the position of the poise on the beam; a shutter for the indicator; and electrical means for operating said shutter.

27. A machine of the class described comprising, in combination, a weighing beam; a poise thereon; an indicator; means for actuating the same to register weights corresponding to the position of the poise on the beam; a shutter for said indicator; and a shutter motor for operating said shutter.

28. A machine of the class described comprising, in combination, a weighing beam; a poise thereon; an indicator; means for causing the same to register weights corresponding to the position of the poise on the beam; a shutter for said indicator; a shutter motor for the latter; and means coöperating with said beam for controlling said shutter motor.

29. A machine of the class described comprising, in combination, a weighing beam; a poise thereon; actuating means for advancing the latter along said beam; a weight indicator constrained to move in accordance with the movement of said poise; and means whereby said indicator may be operated independently of said poise.

30. A machine of the class described comprising, in combination, a weighing beam; a poise; actuating means for advancing the latter along said beam; a weight indicator for registering weights corresponding to positions of said poise; means to operate the indicator with said poise, or independently thereof; and key-controlled means coöperating with said weighing mechanism and having provision for indicating by whom the weight is taken.

31. A machine of the class described comprising, in combination, a weighing beam; a poise therefor; means to move said poise lengthwise of said beam; a weight indicator; means to operate the latter to register movements of said poise or independently thereof; a printing mechanism coöperating with the weighing mechanism for recording the weight indicated at the completion of a weighing operation; said printing mechanism being provided with means for printing characters to indicate by whom the weight is taken.

32. A machine of the class described comprising, in combination, a weighing beam; a poise therefor; actuating means to advance the latter along said beam; a weight indicator for registering movements of said poise; printing means; means for operating on the latter in unison with said weight indicator; means for automatically taking a record from said printing means; and controlling means for said actuating means including key-controlled means for shifting characters on said printing means.

33. A machine of the class described comprising, in combination, a weighing beam; a poise therefor; actuating means for advancing said poise along said beam; key-operated controlling means for said actuating means; and means automatically to prevent removal of said key after a weighing operation is once initiated and prior to the completion of said operation.

34. A machine of the class described comprising, in combination, a weighing beam; a poise therefor; actuating means for advancing said poise along said beam; a weight indicator; driving means for the latter; key-operated controlling means for setting in operation said poise actuating means and said indicator driving means; and key-operated means for operating said indicator driving means independently.

35. A machine of the class described comprising, in combination, a weighing beam; a poise, actuating means therefor; a weight indicator; driving means for the latter; and controlling means for said poise, its actuating means and said indicator driving means having provision whereby a weighing cycle, once initiated, may be followed by an independent adjustment of said indicator.

36. A machine of the class described comprising, in combination, a weighing beam; a poise; actuating means for advancing said poise along said beam; a weight indicator; driving means therefor, controlling means for said actuating means and said driving means comprising a locking mechanism adapted to be unlocked before said controlling means can be operated; and a second locking mechanism having provision for unlocking the same for making scale calibrating operations.

37. A machine of the class described comprising, in combination, a weighing beam; a poise; actuating means for advancing the latter along said beam; a weight indicator; driving means therefor; and controlling means for said poise actuating means and said indicator driving means including key-operated locking mechanism adapted to be unlocked to permit the initiation of a weighing operation and a second key-operated locking mechanism inoperative during a normal weighing cycle and having provision for setting in operation said indicator driving means to the exclusion of the said poise actuating means.

38. A machine of the class described comprising, in combination, a weighing beam; a poise, actuating means for advancing the latter along said beam; a weight indicator; driving means for the latter; controlling means for said poise actuating means and said indicator driving means including means to operate said poise and indicator simultaneously, and means for operating said indicator driving means exclusive of said poise actuating means.

39. A machine of the class described comprising, in combination, a weighing beam; a poise therefor; actuating means for advancing the latter along said beam; controlling means for said actuating means comprising a manually operated rocking shaft; a lever fixed to said shaft; a pin on said lever; a key-controlled disk having a radial slot for permitting the rocking of said lever when said disk is turned to bring said slot in line with said pin; means for locking said shaft after the latter has been turned to initiate a weighing operation; means for releasing said locking means at the end of a weighing operation; thereby permitting said lever pin to be rocked out of the radial slot of said disk and permitting the latter to return to its orginal position and permit the removal of said key.

40. A machine of the class described comprising, in combination, a weighing beam; a poise therefor; actuating means for advancing the latter along said beam; and controlling means for said actuating means comprising a key-controlled locking mechanism having provision when a weighing operation has once been initiated, automatically to prevent withdrawal of the key prior to the completion of a weighing operation.

41. A machine of the class described comprising, in combination, a weighing beam; a poise therefor; actuating means for moving said poise automatically to a point of balance when a weighing operation has been initiated; key-controlled means for initiating a weighing operation; and means to prevent removal of said key from said means prior to the completion of a weighing operation.

42. A machine of the class described comprising, in combination, a weighing beam; a poise; actuating means for advancing the latter along said beam automatically to a point of balance; key-controlled starting means for said actuating means; and means for preventing removal of said key until after a weighing cycle has been completed.

43. A machine of the class described comprising, in combination, a weighing beam; a poise; actuating means for advancing the latter along said beam; key-controlled starting means for initiating a weighing operation; and time mechanism for preventing removal of said key until a predetermined interval has elapsed after the beam balance point has been reached.

44. A machine of the class described comprising, in combination, a weighing beam; a poise therefor; actuating means for advancing the latter along said beam; a weight indicator; driving means for the latter; key-controlled mechanism for setting in operation said poise actuating means and said indicator driving means, and means for preventing removal of said key before a weighing operation has been completed.

45. A machine of the class described comprising, in combination, a weighing beam; a poise; actuating means for advancing the latter along said beam; a weight indicator; driving means for the latter; printing means for recording the weight indicated by said weight indicator; and key-controlled starting means for initiating a weighing operation; and means to prevent removal of said key before the beam has finally tilted and the weight has been recorded.

46. A machine of the class described comprising, in combination, a weighing beam; a poise; actuating means for advancing the latter along said beam; a weight indicator; driving means therefor; key-controlled mechanism for initiating a weighing operation; means for preventing removal of said key prior to the completion of a weighing operation; a second key-controlled mechanism for operating said indicator driving means independently of said poise actuating means; and means for preventing withdrawal of the key from said latter key-operated mechanism prior to the completion of a cycle of weighing operations.

47. A machine of the class described comprising, in combination; a weighing beam; a poise; actuating means for the latter; a weight indicator; driving means for the latter and an adjuster's controlling mechaanism for said poise actuating means and said indicator driving means comprising a radially slotted disk; a rocking lever having a pin adapted to successively enter said slots in said disk when said disk is turned in one direction and means to prevent return of said disk to its key withdrawing position excepting by continued movement in the direction in which said disk started.

48. A machine of the class described comprising, in combination, a weighing beam; a poise; actuating mechanism for advancing the latter along said beam; a weight indicator; means for driving said indicator to register movements of said poise; printing means coöperating with the weight indicator for recording the weight registered by said indicating means; means to initiate a weighing operation; key-controlled means adapted to be operated to permit the initiation of a weighing operation; and an adjuster's key-controlled mechanism comprising means for preventing withdrawal of the adjuster's key prior to the completion of a weighing cycle, an independent indicator adjusting operation and a second weighing cycle.

49. A machine of the class described comprising, in combination, a weighing beam, a poise, actuating means to advance the latter along the former and controlling means for said actuating means comprising a rocking handle, a lever adapted to be rocked thereby, a pin on said lever, a key operated rotative member having a series of slots adapted successively to receive the pin on said lever, stop means to arrest said rotative member with its slots opposite to said pin, and means to dislodge said stop means after said lever pin has been rocked effectively in the slots of said member.

50. A machine of the class described comprising in combination, a weighing beam, a poise, actuating means to advance the latter along the former; an indicator, driving means therefor, key-operated controlling means for said actuating and driving means, including means for operating both for effecting a complete weighing cycle, means for adjusting said indicator driving means independently, and means for operating both for effecting a complete weighing cycle; and means to prevent removal of said key prior to the completion of said operations.

51. A machine of the class described comprising, in combination, a weighing beam; a screw carried by the beam, a poise arranged to travel along the beam and to be actuated by the screw, step-by-step motor means for turning said screw in either direction to cause reverse travel of the poise thereon and means for transmitting the step movements of said motor means to said screw.

52. A machine of the class described comprising, in combination, a weighing beam; a poise therefor; a screw shaft for moving the latter along the former; step-by-step motors; and pawl and ratchet connections from said motors to said shaft.

53. A machine of the class described comprising, in combination, a weighing beam; a screw shaft mounted thereon; a poise moved by said shaft; a step-by-step out-beam motor for turning the latter in one direction and a step-by-step in-beam motor for turning said shaft in the opposite direction.

54. A machine of the class described comprising, in combination, a weighing beam; a screw shaft mounted thereon, a poise moved by said shaft; step-by-step motors; a pawl and ratchet mechanism actuated by one of said motors for turning said shaft in one direction and a pawl and ratchet mechanism actuated by said other motor for turning said shaft in the opposite direction.

55. A machine of the class described comprising, in combination, a weighing beam; a screw; a poise therefor; a rocking armature motor for moving the latter relatively to said beam in one direction and a rocking armature motor for moving said poise in an opposite direction.

56. A machine of the class described comprising, in combination, a weighing beam; a screw associated therewith; a poise for said beam; step-by-step motors coöperatively associated with said screw for moving the poise along said beam in opposite directions; and means actuated by the movement of said beam for controlling said motors.

57. A machine of the class described comprising, in combination, a beam; a poise thereon; a motor for advancing said poise along said beam, a transmitter for controlling said motor; and electric connections for said motor and transmitter for effecting step-by-step movements of said motor and transmitter.

58. A machine of the class described comprising, in combination, a beam; a poise thereon; a step-by-step motor for advancing said poise along said beam; a step-by-step transmitter motor; said motors having electric connections for rocking their armatures alternately.

59. A machine of the class described comprising, in combination, a beam; a poise thereon: actuating means for moving said poise along said beam; key controlled starting means for said actuating means; and means including actuating means and starting means whereby a weighing operation once initiated is automatically completed before said key can be removed.

60. A machine of the class described comprising, in combination, a weighing beam; a poise; a motor for advancing the latter along said beam; a weight indicator; a motor therefor; a transmitter for said motor; a starting circuit for energizing said transmitter; switches in said circuit operated by said beam motor and indicator motor respectively; an operating circuit for said motors; a switch in said circuit operated by said transmitter; a holding circuit for said transmitter adapted to be connected to said operating circuit by said transmitter switch; a circuit for said transmitter; and switches in said circuit operated by said beam and indicator motors.

61. A machine of the class described comprising, in combination, a weighing beam; a poise; actuating means to advance the latter along the former; an indicator; driving means therefor; controlling means coöperating with said actuating and driving means; a closed casing containing said instrumentalities having a window at said indicator and elements for operating said controlling means accessible from the exterior of said casing.

62. A machine of the class described comprising, in combination, a weighing beam; a poise, actuating means to advance the latter along the former; a weight indicator; driving means for the latter; controlling means for starting said poise actuating means; and said indicator driving means; a closed casing containing said instrumentalities having key holes and a window at said indicator; a handle exterior of said casing for operating said controlling means; and locking means for said controlling means operated through key-holes in said casing.

63. A machine of the class described comprising, in combination, a weighing beam; a poise; a motor for moving said poise along said beam; positive locking means for holding said beam stationary after the poise has assumed a final position in a weighing operation; and means for automatically operating said locking means.

64. A machine of the class described comprising, in combination, a weighing beam; a poise; means for moving the latter along the former; and electrical controlling means including locking means coöperating with said beam for automatically completing a weighing operation and locking the beam after the operation is once initiated.

65. A machine of the class described comprising, in combination, a weighing beam; a poise; means for feeding the latter along the beam; and lock and key actuated means including electric controlling means with provision for automatically completing the weighing operation once initiated 66. A machine of the class described comprising, in combination a weighing beam; a poise; actuating means for moving the latter along the former; and means including different keys for controlling the initiation of weighing operations of different characters.

67. A machine of the class described comprising, in combination, a weighing beam, a poise, actuating means for advancing the latter along the former, means for arresting said actuating means after the beam balances, starting means for said actuating means, means for locking said starting means on the initiation of a weighing operation and fan means for delaying the unlocking of said starting means until a predetermined period has elapsed after the beam moves to a final position.

68. A machine of the class described comprising, in combination, a weighing beam, a poise, actuating means for advancing the latter along the former, means for arresting said actuating means after the beam balances, starting means for said actuating means, means for locking said starting means on the initiation of a weighing operation, electrical connections for said actuating and starting means and a motor driven fan for delaying the unlocking of said starting means until a predetermined period has elapsed after the beam reaches its final position.

69. A machine of the class described comprising, in combination, a weighing beam, a poise, actuating means for advancing the latter along the former, means for arresting said actuating means after the beam balances, starting means for said actuating means, means for locking said starting means on the initiation of a weighing operation, an electric circuit and connections for said locking means, a switch in said circuit and a time motor for operating said switch comprising a spring pressed armature, a fan and a gear train between said armature and fan for delaying the rocking of said armature under the action of said spring.

70. A machine of the class described comprising, in combination, a weighing beam, a poise, actuating means for advancing the latter along the former, starting means for said poise actuating means, means for locking said starting means on the initiation of a weighing operation, and means for delaying the closing of a circuit for unlocking said locking means for a predetermined period after the beam reaches a position of balance, said delaying means comprising a switch, a magnet, an armature coöperating with said magnet and adapted to open said switch when said magnet is energized, a spring for moving said armature to close said switch, and a gear train and fan operated by the spring actuated movement of said armature for delaying the closing of said switch.

71. A machine of the class described comprising, in combination, a beam, a poise, a step-by-step motor for advancing the latter along the former, locking means for said beam, a step-by-step time switch motor for delaying the locking of said beam for a predetermined period after the beam reaches the balance point and a transmitter for effecting synchronous movements of said motors.

72. A machine of the class described comprising, in combination, a beam, a poise, a step-by-step motor for advancing the latter along the former, means for recording the weight and time means for delaying the recording of the weight for a predetermined period after the beam reaches its balance point, said time means comprising a switch, electric connections controlled thereby, means for rocking said switch without its closing during the travel of said poise and means to close said switch on the arrest of said poise.

73. A machine of the class described comprising, in combination, a weighing beam, a poise, a weight indicator, step-by-step motors for actuating said poise and indicator and a transmitter motor coöperating with said poise and indicator motors for effecting synchronous beats of the latter.

74. A machine of the class described comprising, in combination, a weighing beam; a screw shaft thereon; means for turning said shaft; a poise moved by said shaft; a weight indicator coöperatively associated with said shaft; a step-by-step motor for said indicator; and a pawl and ratchet mechanism for transmitting the movements of said motor to said indicator.

75. A machine of the class described comprising, in combination, a weighing beam, a poise, an indicator, step-by-step motors for said poise and indicator and a step-by-step transmission motor coöperating with said motors for actuating the latter in synchronism.

76. A machine of the class described comprising, in combination, a beam, a poise thereon, a motor for advancing said poise along said beam, an indicator, a motor for the latter, a transmitter and electric connections for said motors and transmitters for effecting synchronous operations of said motors.

77. A machine of the class described comprising, in combination, a beam, a poise, a weight indicator, motor means synchronously to operate said poise and indicator and means operating through said motor means to adjust one with respect to the other.

78. A machine of the class described comprising, in combination, a beam; a poise thereon; a weight indicator; means including electric connections adapted to operate said indicator in synchronism with said poise; and means including electric connections for adjusting said indicator independently of said poise.

79. A machine of the class described comprising, in combination, a weighing beam, a poise therefor, an electric motor to move said poise lengthwise of said beam, a weight indicator, an electric motor for operating the latter and controlling means for said indicator motor to operate said indicator with said poise or independently thereof.

80. A machine of the class described comprising, in combination, a beam, a poise, motor means to advance the latter along the former, a weight indicator and means operating through said motor means to adjust the indicator to read zero when the poise is in position to cause the beam to balance.

81. A machine of the class described comprising, in combination, a beam, a poise, a weight indicator, motor means synchronously to operate said poise and indicator and means operating through said motor means to adjust said indicator to automatically read the correct weight when the beam is in an unbalanced position.

82. A machine of the class described comprising, in combination, a beam, a poise thereon, motor means to advance the latter along the former, a weight indicator normally movable with said poise and means operating through said motor means to adjust said indicator to read the correct weight when the poise has been moved to bring the beam to an unbalanced position.

83. A machine of the class described comprising, in combination, a weighing beam, a poise coöperatively associated therewith, a weight indicator, poise actuating means, indicator actuating means, and controlling means for said indicator actuating means for calibrating the machine.

84. A machine of the class described comprising, in combination, a weighing beam unbalanced with no load on the scale; a poise; an indicator for registering movements of said poise; and driving means for said poise and indicator having provision for causing the latter to indicate the correct weight of the load on the scale after the beam balances.

85. A machine of the class described comprising, in combination, a weighing beam, a poise, a step-by-step motor for advancing the latter along the former, an electric circuit for said motor, contacts in said circuit, one of said contacts being on said beam and the other comprising an electric conducting liquid, said beam contact being constructed and arranged to project into said liquid sufficiently to cause several steps of said motor after the said beam commences to tilt.

86. A machine of the class described comprising, in combination, a weighing beam fulcrumed adjacent one end thereof and having a screw shaft; a poise; motor means for moving said poise along said shaft beyond the balance point of said beam and having provision for returning the poise to said point; a weight for influencing the tilting of the beam; and means for supporting said weight substantially directly above the fulcrum of the beam.

87. A machine of the class described comprising, in combination, a weighing beam fulcrumed adjacent one end thereof and having a screw shaft; a poise; motor means for moving said poise along said shaft beyond the balance point of said beam and having provision for returning the poise to said point; a weight for influencing the tilting of the beam; and means for supporting said weight substantially directly above the fulcrum of the beam, said support having provision for adjusting said weight to vary the effect thereof.

88. A machine of the class described comprising, in combination, a weighing beam; a poise thereon; electric motive means for moving said poise along said beam; means to enhance a vibratory movement of said beam; combined electric contact and retarding means for said beam and electric connections for said motive means and contacts.

89. A machine of the class described comprising, in combination, a scale beam, a poise, a weight indicator, means for operating said poise and indicator, a shutter for covering said indicator and automatic shutter operating means for causing said shutter to reveal said indicator at the end of a weighing operation.

90. A machine of the class described comprising, in combination, a beam, a poise thereon, a weight indicator, actuating means for said poise and indicator, a shutter for said indicator, and electric connections including means for automatically opening said shutter before and after a weighing operation.

91. A machine of the class described comprising, in combination, a beam, a poise thereon, a weight indicator, a shutter, a shutter motor operating said shutter to close or disclose said indicator, a light for illuminating the latter, a bell for signaling the commencement and close of a weighing operation, electric circuits for said shutter motor, light and bell and means for completing said circuits both preliminary to and after a weighing opertaion.

92. A machine of the class described comprising, in combination, a beam; a poise thereon; a motor for moving said poise along said beam; a weight indicator; a motor therefor; a transmitter for said motors, a starting electric circuit for said transmitter; an operating electric circuit for said motors and handle operated means for closing said circuits to initiate a weighing operation; and means automatically to break said starting circuit after the completion of a weighing operation.

93. A machine of the class described comprising, in combination, a beam; a poise; an indicator for registering movements of said poise; electric means for moving the poise along the beam; a shutter for said indicator; a shutter motor; a starting circuit for said means; a shutter motor circuit; a switch in said starting circuit and means for opening said switch on the energization of said shutter motor to open said shutter preliminary to a weighing operation and for closing said switch on the deënergization of said motor to close said shutter on the initiation of a weighing operation.

94. A machine of the class described comprising, in combination, a beam; a poise; electric means for moving the latter along the former; an indicator for registering movements of said poise; a shutter for said indicator; a shutter motor; a starting circuit for said means; a shutter motor circuit; a switch in said starting circuit operated by said shutter motor; a switch in said shutter motor circuit; means for closing said switch and opening the former switch preliminary to a weighing operation and for closing said starting circuit switch and for opening said shutter circuit switch on the initiation of a weighing operation.

95. A machine of the class described comprising, in combination, a beam; a poise; electric means for moving the latter along the former; a starting circuit for said means; a shutter; a shutter motor; a shutter motor electric circuit; a switch in said starting circuit operated by said shutter motor; a switch in said shutter circuit, the latter switch being automatically opened on the initiation of a weighing operation and a release motor for closing said switch prior to the completion of said operation.

96. A machine of the class described comprising, in combination, a beam; a poise; electric means for moving the latter along the former; a starting electric circuit for said means; a shutter; a shutter motor; a shutter motor electric circuit; a switch in said starting circuit operated by said shutter motor; an operating handle; a switch in said starting circuit closed by a movement of said handle for initiating a weighing operation and a switch in said shutter motor circuit opened by the same movement of said handle.

97. A machine of the class described comprising, in combination, a beam; a poise; electric means for moving the latter along the former; a starting circuit for said means; a weight indicator; a shutter therefor; a shutter motor; a shutter motor circuit; a switch in said starting circuit controlled by said shutter motor circuit; a switch in said shutter motor circuit; a release motor for closing said last named switch; an electric circuit for said release motor; a switch in said release motor circuit; and a time device for operating the switch in said release motor circuit.

98. A machine of the class described comprising, in combination, a weighing beam, a shaft thereon, a poise moved longitudinally of said beam by said shaft, a motor, a motor shaft and an insulated coupling connecting said shafts to prevent conduction from one to the other.

99. A machine of the class described comprising, in combination, a weighing beam, a shaft thereon, a poise moved longitudinally of said beam by said shaft, an electric motor, a motor shaft, cranks on adjacent ends of said shaft, a cross head carried by one of said cranks, a pin on the other crank and in said cross-head and an insulation bushing separating said pin from said cross-head.

100. A machine of the class described comprising, in combination, a weighing beam, a poise thereon, a weight indicator, step-by-step motors for moving said poise and indicator incrementally and transmitters for controlling said motors for moving the same step-by-step synchronously.

101. A machine of the class described comprising, in combination, a weighing beam, a poise, a weight indicator, a weight recorder, indicator and recorder motors, means for operating said poise and indicator and recorder motors in unison, starting means for controlling said motors, electric connections for said instrumentalities and key actuated locking means for preventing a second weighing operation prior to the completion of a weighing operation once initiated.

102. A machine of the class described comprising, in combination, a weighing beam, a poise, a weight indicator, electric motive means for actuating said poise and indicator, electric connections including circuits for operating said motive means and switches in said circuits each comprising a spaced pair of spring fingers and a bridge contact knife, and means to rock the bridge contacts of said switches in unison to open and close their circuits simultaneously.

103. A machine of the class described comprising, in combination, a weighing beam, a poise thereon, a weight indicator, a recorder, motors, electric connections and circuits for operating said poise, indicator and recorder, and controlling means for said parts including a starting mechanism for causing said instrumentalities to perform a weighing operation, a switch in said circuits, an actuating handle for said starting mechanism and connections from said handle to said switch and recorder.

104. A machine of the class described comprising, in combination, a weighing beam, a poise thereon, a weight indicator, a recorder; motors, electric connections and circuits for operating said poise, indicators and recorder and controlling means for said parts including a beam lock, a starting mechanism for causing said instrumentalities to perform a weighing operation, a switch in said circuits, an actuating handle for said starting mechanism and means whereby movements of said handle operate said switch and recorder and unlock said beam lock.

105. A machine of the class described comprising, in combination, a weighing beam A, a poise B thereon, actuating devices $M^o$, $M^i$ for said poise; a weight indicator I, actuating devices $I^{up}$, $I^{dn}$ for the latter, transmitters $T^o$, $T^1$ coöperating with said actuating devices, a reverse switch R for said devices, a beam lock mechanism L, a recorder W, an actuating mechanism S operating said instrumentalities; electric circuits and connections for said instrumentalities, a switch C in one of said circuits, a release motor $M^r$ for operating said switch C, an unlocking motor $M^u$ for said actuating mechanism and a time switch T for controlling operations of some of said instrumentalities.

106. In a weighing machine, the combination of a beam with a poise thereon, out and in beam motors for advancing said poise along said beam, an indicator, increment and decrement motors for the latter, transmitters for controlling said motors, switches operated at said motors and a transmitter starting circuit passing serially through said switches and leading to said transmitter.

107. A machine of the class described comprising, in combination, a beam; a poise movable thereon; a weight recorder movable with said poise and means to adjust said recorder relatively to said poise, said recorder including means to indicate if said recorder is turned decrementally from a zero reading and means to move said recorder in accordance with said poise.

In testimony whereof, we have signed our names to this specification, in the presence of two subscribing witnesses.

ARTHUR A. ADAMS.
FRANK A. EMERY.

Witnesses:
EVERETT S. EMERY,
HENRY T. WILLIAMS.